US012607279B2

(12) United States Patent
Vu

(10) Patent No.: US 12,607,279 B2
(45) Date of Patent: Apr. 21, 2026

(54) GASKET RETAINER FOR SURFACE MOUNT FLUID COMPONENT

(71) Applicant: Compart Systems PTE. Ltd., Singapore (SG)

(72) Inventor: Kim Ngoc Vu, Yorba Linda, CA (US)

(73) Assignee: Compart Systems PTE. Ltd., Singapore (SG)

( * ) Notice: Subject to any disclaimer, the term of this patent is extended or adjusted under 35 U.S.C. 154(b) by 0 days.

(21) Appl. No.: 18/371,649

(22) Filed: Sep. 22, 2023

(65) Prior Publication Data

US 2024/0125412 A1 Apr. 18, 2024

Related U.S. Application Data

(60) Continuation of application No. 17/549,023, filed on Dec. 13, 2021, now Pat. No. 11,796,089, which is a
(Continued)

(51) Int. Cl.
*F16L 5/10* (2006.01)
*F16J 15/12* (2006.01)
(Continued)

(52) U.S. Cl.
CPC ............... *F16L 5/10* (2013.01); *F16J 15/122* (2013.01); *F01N 13/1805* (2013.01);
(Continued)

(58) Field of Classification Search
CPC .. F16J 15/061; F16J 15/0818; F01N 13/1827; F01N 13/1805; F16L 5/10
(Continued)

(56) References Cited

U.S. PATENT DOCUMENTS

| | | | |
|---|---|---|---|
| 1,659,677 | A | 2/1928 | Welsh |
| 2,087,430 | A | 7/1937 | Cummins |

(Continued)

FOREIGN PATENT DOCUMENTS

| | | |
|---|---|---|
| CN | 101333982 A | 12/2008 |
| DE | 2608892 A1 | 9/1977 |

(Continued)

OTHER PUBLICATIONS

Office Action dated Nov. 6, 2017 issued to connection with corresponding Korean pat. App. No. 10-2016-7021808.
(Continued)

*Primary Examiner* — Babajide A Demuren
(74) *Attorney, Agent, or Firm* — Dykema Gossett PLLC

(57) ABSTRACT

A gasket retainer that is absent sharp corners, has apertures of reasonable dimensional tolerance, and may be conveniently made by a variety of manufacturing processes. The retainer is made from thin flat springy material that readily returns to form after slight bending. Representative gasket capturing apertures are of smoothly non-convex outline with major dimension sufficiently large to allow passage of a ring shaped gasket turned on edge and minor dimension sufficiently small to engage, on approximately opposite circular segments that each engage along less than one third of a gasket circumference, a cavity or groove on the outside diameter periphery of the gasket turned flat parallel to the retainer material sheet. Fasteners may be retained by similar apertures.

13 Claims, 22 Drawing Sheets

Related U.S. Application Data continuation of application No. 16/705,996, filed on Dec. 6, 2019, now Pat. No. 11,226,039, which is a division of application No. 15/871,520, filed on Jan. 15, 2018, now Pat. No. 10,502,321, which is a continuation-in-part of application No. 14/155,333, filed on Jan. 14, 2014, now Pat. No. 9,869,409.

(60) Provisional application No. 61/848,929, filed on Jan. 15, 2013.

(51) Int. Cl.

| | |
|---|---|
| *F01N 13/18* | (2010.01) |
| *F16J 15/06* | (2006.01) |
| *F16J 15/08* | (2006.01) |

(52) U.S. Cl.
CPC ......... *F01N 13/1827* (2013.01); *F16J 15/061* (2013.01); *F16J 15/0818* (2013.01)

(58) Field of Classification Search
USPC ....... 277/317, 321, 608, 609, 610, 630, 637, 277/639, 644
See application file for complete search history.

(56) References Cited

U.S. PATENT DOCUMENTS

| | | | |
|---|---|---|---|
| 3,477,867 | A | 11/1969 | Hillier |
| 3,857,572 | A | 12/1974 | Taylor et al. |
| 3,944,235 | A | 3/1976 | Gordon |
| 4,091,454 | A | 5/1978 | Kauffmann |
| 4,405,138 | A | 9/1983 | Skrycki |
| 4,653,938 | A | 3/1987 | Fenwick |
| 4,813,691 | A | 3/1989 | Schoenborn |
| 5,137,674 | A | 8/1992 | Braconier |
| 5,636,515 | A | 6/1997 | Matsumoto et al. |
| 5,713,582 | A | 2/1998 | Swensen et al. |
| 5,730,448 | A | 3/1998 | Swensen et al. |
| 5,791,660 | A | 8/1998 | Belter |
| 5,797,604 | A | 8/1998 | Inagaki et al. |
| 5,944,322 | A | 8/1999 | Coff et al. |
| 5,979,906 | A | 11/1999 | Silvian |
| 5,984,318 | A | 11/1999 | Kojima et al. |
| 5,992,463 | A | 11/1999 | Redemann et al. |
| 6,068,016 | A | 5/2000 | Manofsky, Jr. et al. |
| 6,161,840 | A | 12/2000 | Boardman et al. |
| 6,209,319 | B1 | 4/2001 | Maeda et al. |
| 6,257,592 | B1 | 7/2001 | Hashizawa et al. |
| 6,394,138 | B1 | 5/2002 | Vu et al. |
| 6,409,180 | B1 | 6/2002 | Spence et al. |
| 6,474,700 | B2 | 11/2002 | Redemann et al. |
| 6,845,984 | B2 | 1/2005 | Doyle |
| 6,918,597 | B2 | 7/2005 | Egloff |
| 6,945,539 | B2 | 9/2005 | Whitlow et al. |
| 6,962,346 | B2 | 11/2005 | Kerchner et al. |
| 6,974,137 | B2 | 12/2005 | Beutter et al. |
| 7,126,094 | B2 | 10/2006 | Bower et al. |
| 7,926,852 | B2 | 4/2011 | Geminn |
| 7,975,473 | B2 | 7/2011 | Marotta et al. |
| 8,109,520 | B2 | 2/2012 | Imai |
| 8,186,690 | B2 | 5/2012 | Imai |
| D666,853 | S | 9/2012 | Tunstall |
| 8,616,818 | B2 | 12/2013 | Travis |
| D697,386 | S | 1/2014 | Dooley |
| 2002/0063396 | A1 | 5/2002 | Doyle |
| 2002/0135137 | A1 | 9/2002 | Hammi |
| 2003/0080514 | A1 | 5/2003 | Barclay et al. |
| 2003/0163459 | A1 | 8/2003 | Shem-Ur |
| 2003/0164594 | A1 | 9/2003 | Whitlow et al. |
| 2003/0184027 | A1 | 10/2003 | Shibata et al. |
| 2003/0205865 | A1 | 11/2003 | Bock |
| 2004/0232625 | A1 | 11/2004 | Kerchner et al. |
| 2005/0023768 | A1 | 2/2005 | Adams et al. |
| 2005/0280214 | A1 | 12/2005 | Richards |
| 2008/0309027 | A1 | 12/2008 | Rogeon et al. |
| 2009/0072495 | A1 | 3/2009 | Kullen et al. |
| 2009/0287258 | A1 | 11/2009 | Vannemreddy |
| 2011/0049813 | A1 | 3/2011 | Han |
| 2013/0213343 | A1 | 8/2013 | Culp et al. |
| 2014/0252724 | A1 | 9/2014 | Guidi et al. |

FOREIGN PATENT DOCUMENTS

| | | |
|---|---|---|
| DE | 10138185 A1 | 5/2003 |
| EP | 1209383 A2 | 5/2002 |
| EP | 1350992 A2 | 10/2003 |
| JP | H10209312 A | 8/1998 |
| JP | 2001141062 A | 5/2001 |
| JP | 2005-517883 A | 6/2005 |
| JP | 2012077867 A | 4/2012 |
| JP | 2013-190055 A | 9/2013 |
| JP | 5828867 B2 | 12/2015 |

OTHER PUBLICATIONS

International Search Report and Written Opinionn, corresponding to PCT/US2014/036566, international filing date May 2, 2014.

Office Action dated Nov. 16, 2017 in connection with related Chinese Pat. App. No. 201480075506.7.

Office Action dated Dec. 11, 2017 in connection with related German Pat. App. No. 11 2014 006 157.3.

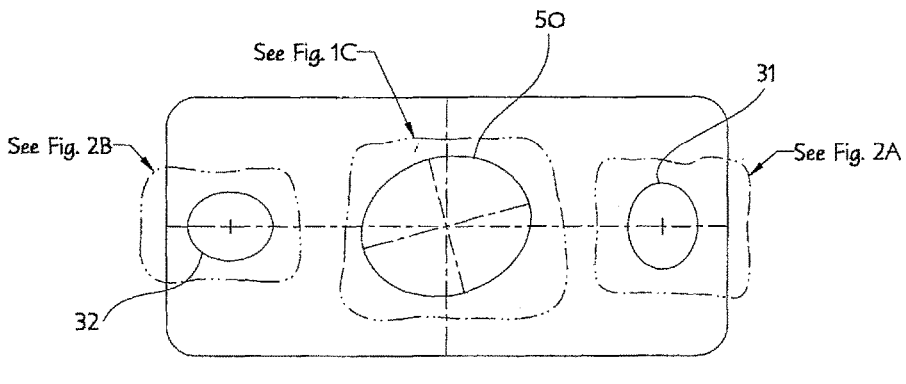
Fig. 1B
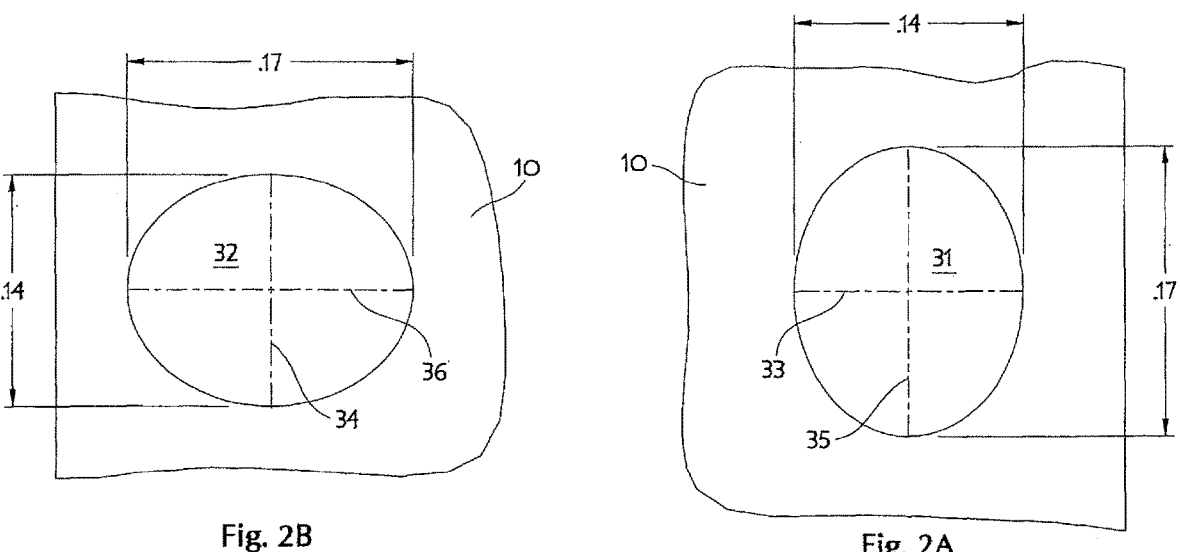
Fig. 2B
Fig. 2A

A-A

D-D

C-C

See Fig. 2D

See Fig. 2E

Detail View X1

Detail View X2

GASKET RETAINER FOR SURFACE MOUNT FLUID COMPONENT

This application is a continuation of U.S. application Ser. No. 17/549,023 (the '023 application), filed 13 Dec. 2021, which is a continuation of U.S. application Ser. No. 16/705,996 (the '996 application), filed 6 Dec. 2019, now U.S. Pat. No. 11,226,039 issued on 18 Jan. 2022, which is a divisional of U.S. application Ser. No. 15/871,520 (the '520 application), filed 15 Jan. 2018, now U.S. Pat. No. 10,502,321 issued on 10 Dec. 2019; which is a continuation-in-part application of U.S. application Ser. No. 14/155,333 (the '333 application), filed 14 Jan. 2014, now U.S. Pat. No. 9,869,409 issued on 16 Jan. 2018; which claims priority to U.S. provisional application no. 61,848,929, filed 15 Jan. 2013 (the '929 application). The '023 application, the '996 application, the '520 application, the '333 application, and the '929 application are all hereby incorporated by reference, in their entireties, as though fully set forth herein.

BACKGROUND OF THE INVENTION

Implementation of removable fluid pathway joints using gaskets is well known. Early examples include the connection of pipe segments described in the 1920's work of the American Standards Association (ASA B16e-1932) which has been updated and expanded over many years to the present American Society of Mechanical Engineers standard for Pipe Flanges and Flanged Fittings (ASME B16.5-2009). In some situations it is desired to have a subassembly comprising a gasket positioned by a locating part to ensure correct assembly of the joint. U.S. Pat. No. 3,857,572 issued to Taylor and Halling discloses one such example and U.S. Pat. No. 6,409,180 issued to Spence and Felber discloses a more recent example.

Representative fluid delivery apparatus are found, for example, among industrial equipment producing fine chemicals, petroleum products, or semiconductors, and may be subjected to vacuum, or pressure, or purity requirements, and combinations thereof. Fluid pathways among elements intended for manipulating process materials within semiconductor manufacturing equipment usually require attention to maintaining high purity of the delivered reactants and also typically have a much smaller cross-section than fluid pathways used in petrochemical plants, for example. Fluid delivery systems for semiconductor manufacturing equipment typically use surface mount components removably attached to substrates containing fluid pathways. The interface between each component and substrate is generally planar with fluid conduit ports having structural details dependent upon the specific seal design. Example systems are disclosed in U.S. Pat. No. 6,068,016 issued to Manofsky and Fittro, and also U.S. Pat. Nos. 5,992,463 and 6,394,138, both issued to the present inventor Kim Ngoc Vu, et al.

A known fluid pathway joint (familiarly called the C-seal joint type) uses a ring-shaped metallic gasket of complex shape compressed between opposing apparatus elements wherein the face of at least one element has a circular counterbore depression to receive the gasket. In some implementations a separate retainer is provided for holding and centering the gasket during joint assembly whereby the retainer engages a cavity or groove on the periphery of the gasket. The retainer illustrated in the previously mentioned Manofsky-'016 system example may be seen individually in U.S. Pat. No. 5,713,582, issued to Swensen, et al. Another counterbore gasket with separate retainer is disclosed in U.S. Pat. No. 5,797,604 issued to Inagaki, et al, and that retainer may be seen individually in U.S. Pat. No. 5,984,318 issued to Kojima and Aoyama. Yet another counterbore gasket with separate retainer is disclosed in U.S. Pat. No. 5,771,919 issued to Itoi, et al. An additional separate retainer for C-seal type joints is disclosed in U.S. Pat. No. 6,845,984 issued to Doyle, another retainer is disclosed in U.S. Pat. No. 6,945,539 issued to Whitlow, et al, and yet another retainer commercially available from Microflex Technologies (Anaheim, CA; www.microflexseals.com) is illustrated in FIG. 4 of this application.

The foregoing retainer designs use thin flat sheet metal as the basic material of construction and engage a cavity or groove on the outside diameter periphery of a gasket. A related but nonmetallic retainer is disclosed in U.S. Pat. No. 5,730,448 issued to Swensen, et al, wherein a circumferential recess of the gasket is engaged by a resilient element. U.S. Pat. No. 7,126,094, issued to Bower and Chase, discloses a flat heater comprised of metallic resistance material and insulating plastic together forming a structure which may simultaneously serve as a retainer for C-seal gaskets. U.S. Pat. No. 6,474,700, issued to the present inventor Kim Ngoc Vu, et al, discloses a retainer that overlaps peripheral projections of a Z-seal gasket (one known variant of a gasket shearing type of seal arrangement) instead of engaging the circumferential groove of a C-seal gasket.

Illustrated in FIG. 4 is a plan view of a prior art retainer design 400 commercially available from Microflex Technologies of Anaheim, California, for use with a two-port surface mount K1S style fluid delivery component. The prior art retainer 400 is made from a thin flat square member 410 of stainless steel sheet metal having two circular gasket-capturing apertures 440, 444 for use with known C-seal gaskets (not shown), and four fastener apertures 431, 432, 437, 438 in locations corresponding to the corner mounting holes of a fluid delivery component of square shape approximately 1.115-inch by 1.115-inch. Each gasket-capturing aperture 440, 444 has two cantilevered projections (a total of four projections in the case of a two-gasket retainer as illustrated) 450, 460, 454, 464 appearing similar to triangular points. Each generally triangular projection is formed by a straight slot, intersecting tangentially to the perimeter of each gasket-capturing aperture, defining one side and an intersected arc segment forming another side, and each triangle base being contiguous with the remainder of the square member 410. An intervening web of material 480 makes one gasket-capturing aperture 440 distinct from the other aperture 444. Each fastener aperture 431, 432, 437, 438 has three cantilevered tabs intended to engage external threads passing through. Designers should thus appreciate that the prior art retainer 400 has many small sharp locally convex features prone to snagging during handling.

The retainers illustrated in Swensen-'582, Doyle-'984, the Microflex Technologies item as FIG. 4 herein, and Swensen-'448, all use cantilevered portions of the retainer to engage a cavity or groove on the outside diameter periphery of each of one or more C-seal type gaskets. The cantilevered portions of such retainers have several relatively sharp projecting corners, are consequently delicate and prone to handling damage, and require manufacturing processes capable of forming thin arms or narrow slots. Additionally, the retainer illustrated in Whitlow-'539 has relatively sharp corners at its "interference region" and needs close dimensional tolerances to correctly hold a gasket by engaging a peripheral groove.

SUMMARY OF THE INVENTION

The present invention is related to a retainer for positioning one or more gaskets in a plane to effect the leak-free joining of conduit ports comprising one or more fluid pathways. The retainer is a flexible generally flat sheet having specially shaped apertures which removably capture one or more circular gaskets to be held in relative alignment during fluid pathway joint assembly. The invention is particularly suited for, but not limited to, use with high purity fluid handling components attached to substrates in a surface mount fluid delivery system using a plurality of fasteners.

In consideration of the foregoing problems identified in the background portion of this specification, the inventor has developed a gasket retainer that is absent sharp corners, has apertures of reasonable dimensional tolerance, and may be conveniently made by a variety of manufacturing processes. The retainer is made from thin flat springy material that readily returns to form after slight bending and therefore can be metallic or of alternate materials as desired. Embodiments of the inventive gasket retainer comprise one or more gasket-capturing apertures and two or more fastener apertures. Each gasket capturing aperture engages a cavity or groove on the outside diameter periphery of each respective gasket on opposing circular segments that each engage along less than one third of a gasket circumference.

One retainer embodiment provides a smoothly concave oblong gasket-capturing aperture of oval outline, with a major diameter sufficiently large to allow passage of a C-seal type gasket turned on edge and a minor diameter sufficiently small to engage a cavity or groove on the outside diameter periphery of the C-seal type gasket when turned flat and parallel to the retainer material sheet. In another embodiment the oval aperture outline corresponds mathematically to an elliptical shape. Apertures of these types have two-fold rotational symmetry being identical both when reflected left to right and also when reflected top to bottom.

Yet another retainer embodiment provides an oblong gasket-capturing aperture with periphery having at least one substantially straight portion, yet also absent any convexity, and having major dimension sufficiently large to allow passage of a C-seal type gasket turned on edge and minor dimension sufficiently small to engage a cavity or groove on the outside diameter periphery of the C-seal type gasket when turned flat and parallel to the retainer material sheet. In another embodiment the oblong gasket-capturing aperture periphery has at least one portion with curvature substantially less than an opposite located portion. Apertures of these D-shaped types lack rotational symmetry and are identical only when reflected left to right (or top to bottom, depending upon nominal orientation, but not both simultaneously).

Yet another retainer embodiment provides a gasket-capturing aperture with smoothly non-convex outline wherein three identically shaped periphery portions may be substantially straight or have relatively large curvature. Apertures with three substantially straight portions appear as an equilateral triangle with convenient radii in place of the corresponding vertices. Apertures with three portions of relatively large curvature appear as a Reuleaux triangle, with convenient radii in place of the corresponding vertices, similar to the tri-oval form of motor vehicle racing course. Apertures of these triangular-shaped types have 3-fold rotational symmetry and are identical only when reflected left to right (or top to bottom, depending upon nominal orientation, but not both simultaneously) through a line bisecting a vertex and opposite base portion. The radii in place of the corresponding triangle vertices are chosen to be small enough to create a sufficiently clear opening to allow passage of a C-seal type gasket turned on edge along each of the identically shaped aperture periphery portions.

Each non-convex gasket-capturing aperture in a retainer may be forced to admit a gasket placed coplanar by elastically bending the springy retainer material temporarily. A typical process for inserting a gasket into a retainer gasket-capturing aperture involves steps of engaging the aperture smaller dimension internal edge into the full depth of the gasket peripheral groove, flexing the retainer material in three dimensions, thereby bringing the aperture larger dimension extremes toward each other while simultaneously distending the opposite smaller dimension internal edge of the aperture to clear the external diameter of the gasket. Then, the gasket can be brought to a position coplanar with the retainer portion already engaged in the gasket peripheral groove, and the flexure of the retainer is released to thereby allow the opposite smaller dimension internal edge of the gasket-capturing aperture to also engage the gasket peripheral groove.

In many circumstances it is useful to have fastener apertures in a gasket retainer designed to engage a threaded portion of fasteners intended to effect the joint between mating conduit ports. Such engagement between retainer and thread generally will hold together as an interim subassembly the retainer, fasteners, one or more gaskets, and a component having one of the mating conduit ports, thus making easier the fluid pathway joining process. One retainer embodiment provides an oblong fastener aperture with a periphery lacking any convexity and having a major dimension sufficiently large to allow passage of the outside diameter of the fastener threaded portion, and a minor dimension sufficiently small to engage the fastener thread groove without binding. Any non-convex aperture shape suited to a gasket-capturing aperture may also be used for a fastener aperture after appropriate dimensional scaling. Thus, a fastener aperture may be an oval, an ellipse, D-shaped, triangular or tri-oval, for example, and any combinations of the foregoing. A typical process for engaging an externally threaded (male) fastener portion with a fastener aperture involves rotating the fastener along the thread axis allowing it to mesh with the fastener aperture minor dimension as if it were a mating (female) internal thread.

In one aspect of the invention, there is provided a gasket retainer for use in a fluid delivery system, which comprises a base member formed of a substantially flat sheet of material and a gasket-capturing aperture disposed in said base member. Advantageously, the gasket-capturing aperture has an oval periphery along at least a portion thereof, with a major diameter sufficiently large to allow passage of a circular element therethrough and a minor diameter sufficiently small to engage a cavity, groove, or thread on the outside diameter of said circular element. Preferably, at least two fastener apertures are disposed on opposing sides of the gasket-capturing aperture. The oval periphery, in certain embodiments, is smoothly concave and corresponds mathematically to an elliptical shape.

Advantageously, the ellipse major axis dimension is at least about 1.15 times (115%) the minor axis dimension, and preferably approximately 1.25 times (125%) the minor axis dimension.

The base member is preferably comprised of stainless steel, and has a length and a width, and each of the major and minor diameters of the gasket-capturing aperture are rotated approximately 15 degrees with respect to corresponding ones of the length and width of the base member.

In one particular embodiment, the gasket-capturing aperture is D-shaped, and comprises approximately one-half of a larger ellipse which is truncated along the minor diameter by a straight portion blended into corner curves at opposing ends of the straight portion.

In some embodiments, the periphery of the gasket-capturing aperture is non-convex.

In another aspect of the invention, there is provided a gasket retainer for use in a fluid delivery system, which comprises a base member formed of a substantially flat sheet of material, and a gasket-capturing aperture having a smoothly non-convex periphery, which does not have a continuously changing curvature. The periphery is defined by three substantially identically shaped periphery portions and three curved radii joining opposing ends of each of the three substantially identically shaped periphery portions, so that the aperture is substantially triangular in appearance. The aperture defines a sufficiently sized opening to allow passage of a circular element therethrough between each of the substantially identically shaped periphery portions and opposing aperture periphery radii, while simultaneously maintaining sufficiently small clearance between adjacent pairs of the identically large curvature periphery portions to engage a cavity, groove, or thread on the outside diameter of that circular element.

Preferably, the gasket retainer further comprises at least two fastener apertures disposed on opposing sides of the gasket-capturing aperture. In some embodiments, the three substantially identically shaped periphery portions have a relatively large curvature which appear substantially straight. The non-convex aperture, in certain embodiments, appears as a Reuleaux triangle or tri-oval shape.

In another aspect of the invention, there is provided a gasket retainer for use in a fluid delivery system, which comprises a base member formed of a substantially flat sheet of material and a gasket-capturing aperture having a non-convex periphery disposed in the base member wherein the gasket-capturing aperture is generally rectangular in shape. The periphery is defined by four similar large radius portions and four small curved radii joining adjacent ends of each of the four similar large radius portions, and at least one pair of opposite large radius portions are sufficiently close (diametrically) so as to engage a cavity, groove, or thread on the outside diameter of a circular element such as a gasket or a fastener.

The invention, together with additional features and advantages thereof, may be best understood by reference to the following description taken in conjunction with the accompanying illustrative drawings. In these accompanying drawings, like reference numerals designate like parts throughout the Figures.

BRIEF DESCRIPTION OF THE DRAWINGS

FIG. 1B is a plan view of the representative retainer illustrated in FIG. 1A without a gasket;

FIG. 2A is a detail view of a fastener aperture illustrated in FIG. 1B;

FIG. 2B is a detail view of another fastener aperture illustrated in FIG. 1B;

FIG. 2C is a perspective view of the representative retainer illustrated in FIG. 1A with gasket and fasteners (but fluid pathway elements are left out for clarity);

DETAILED DESCRIPTION OF THE INVENTION

Figure 1A:
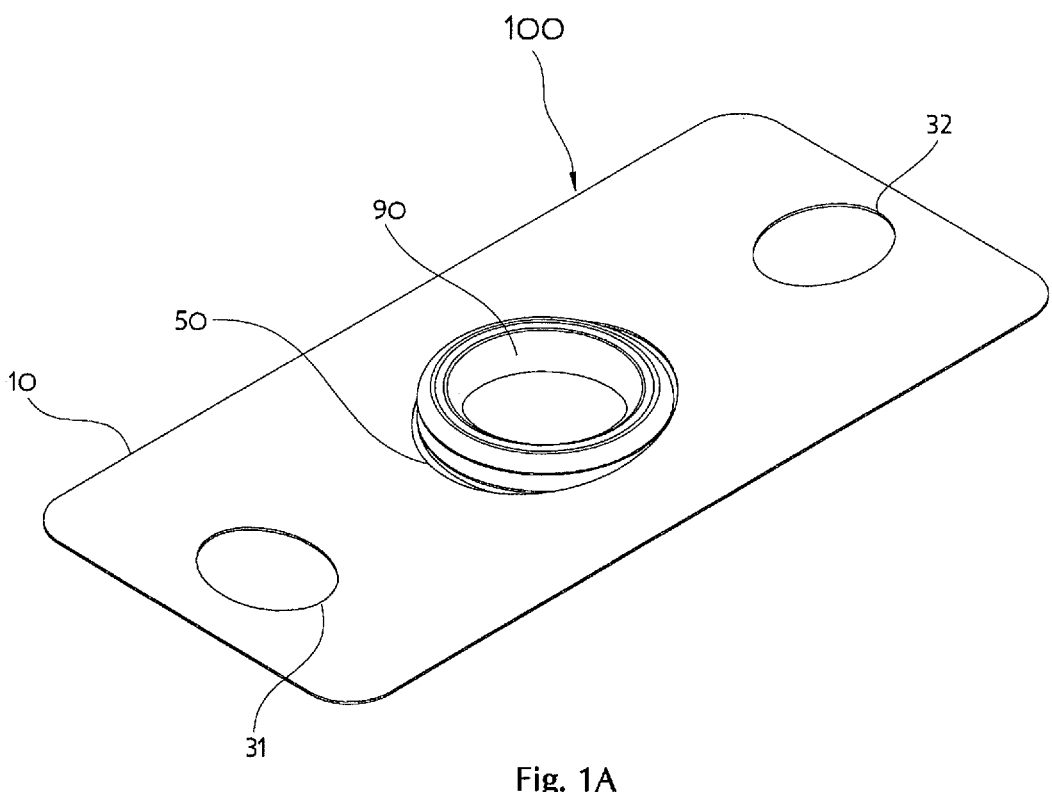
FIG. 1A is a perspective view of a representative retainer with a gasket inserted.

Referring now more particularly to the drawing Figures, wherein like reference numerals designate identical or corresponding parts throughout the several views and embodiments, there is shown in FIG. 1A a perspective view of an inventive embodiment of a gasket retainer with a removably captured C-seal type gasket. The gasket retainer 100 is made from a thin flat rectangular piece of sheet material or member 10. The retainer 100 includes an oblong gasket-capturing aperture 50 with a C-seal gasket 90, of known construction, removably retained therein. A pair of fastener apertures 31, 32 are disposed adjacent diametrically oppo-site sides of the gasket. Representative dimensions of the thin flat rectangular member 10 and relative locations of the apertures 31, 32, and 50 are illustrated in FIGS. 1B, 1C, 2A, and 2B for the design of a retainer 100 intended for use with semiconductor equipment fluid delivery systems. Other applications may require systems having different dimen-sions. In such fluid systems the sheet material is typically 0.0030(+/−0.0002)-inch thick full hard 300-series stainless steel, but other constructions such a plastic or heater com-posites are also feasible. The rectangular retainer 100 may be approximately 0.510-inch by 1.115-inch, as might be suitable for use with a two-bolt flange connection in a K1S surface mount system. Again, dimensions may vary consid-erably within the scope of the present invention. Apertures may be cut in the thin flat full hard 300-series stainless steel by chemical etching, fine blanking, laser cutting, and similar common manufacturing processes.

Figure 1C:
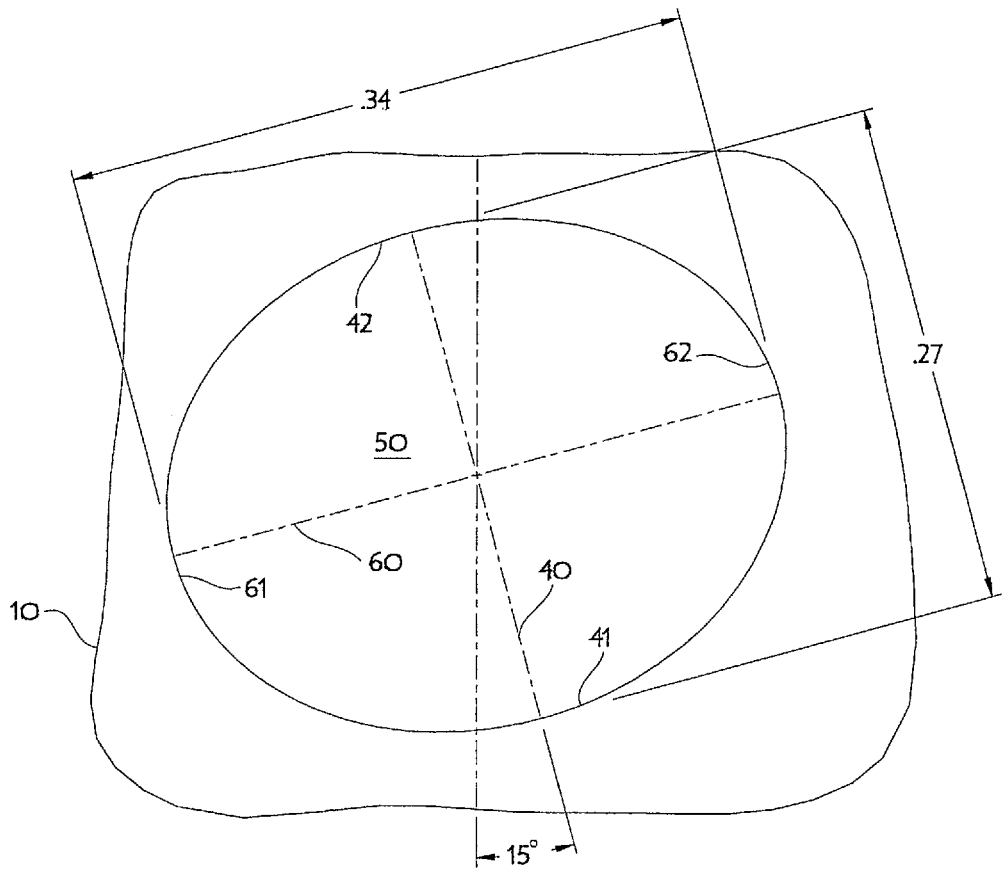
FIG. 1C is a detail view of the gasket-capturing aperture illustrated in FIG. 1B.

The representative oblong gasket-capturing aperture 50 as illustrated in FIG. 1C has a smoothly concave shape of oval outline with a major diameter 60 sufficiently large to allow passage of a C-seal type gasket turned on edge and a minor diameter 40 sufficiently small to engage a cavity or groove on the outside diameter periphery of the C-seal type gasket turned flat and parallel to the retainer material sheet 10. The inventor has discovered that an aperture with a larger dimension of 0.340-inch and a smaller dimension of 0.272-inch provide a gasket-capturing aperture 50 that functions well in the instance of the known C-seal gasket 90. A true mathematical ellipse may conveniently describe the gasket-capturing aperture 50 when computer aided design (CAD) methods are used. An ellipse with major axis sized at least 1.15 times the minor axis dimension, and preferably approximately 1.25 (125%) times the minor axis dimension, corresponds to the representative aperture illustrated in FIG. 1C. The gasket-capturing aperture axes 40, 60 may also be advantageously rotated approximately 15 degrees with respect to the coordinate system of the thin flat rectangular member 10 as will be explained later below.

Figures 1D, 1E:
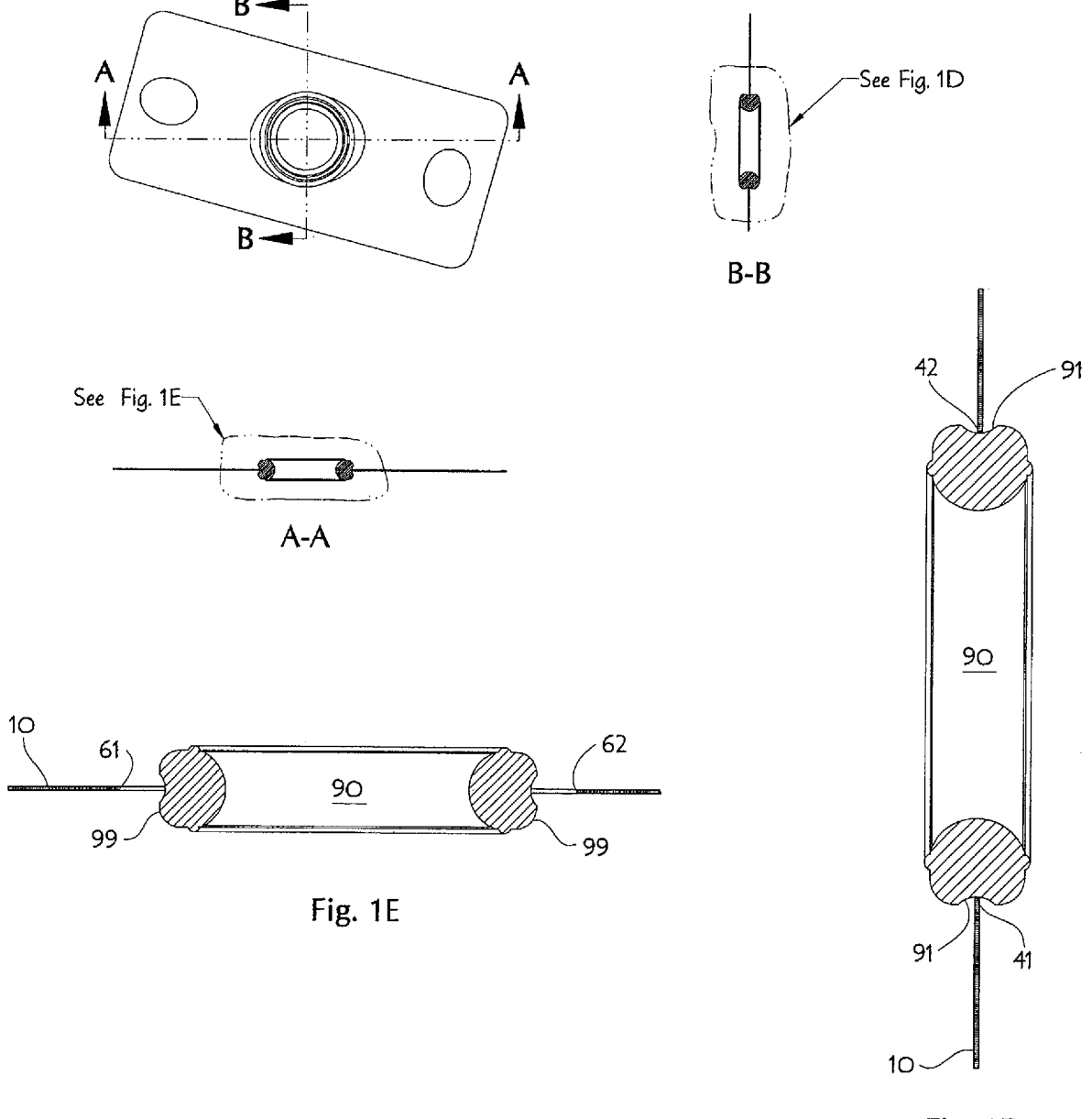
FIG. 1D is a cross-section through the gasket-capturing aperture minor axis with a gasket inserted as in FIG. 1A.
FIG. 1E is a cross-section through the gasket-capturing aperture major axis with a gasket inserted as in FIG. 1A.
Figure 1F:
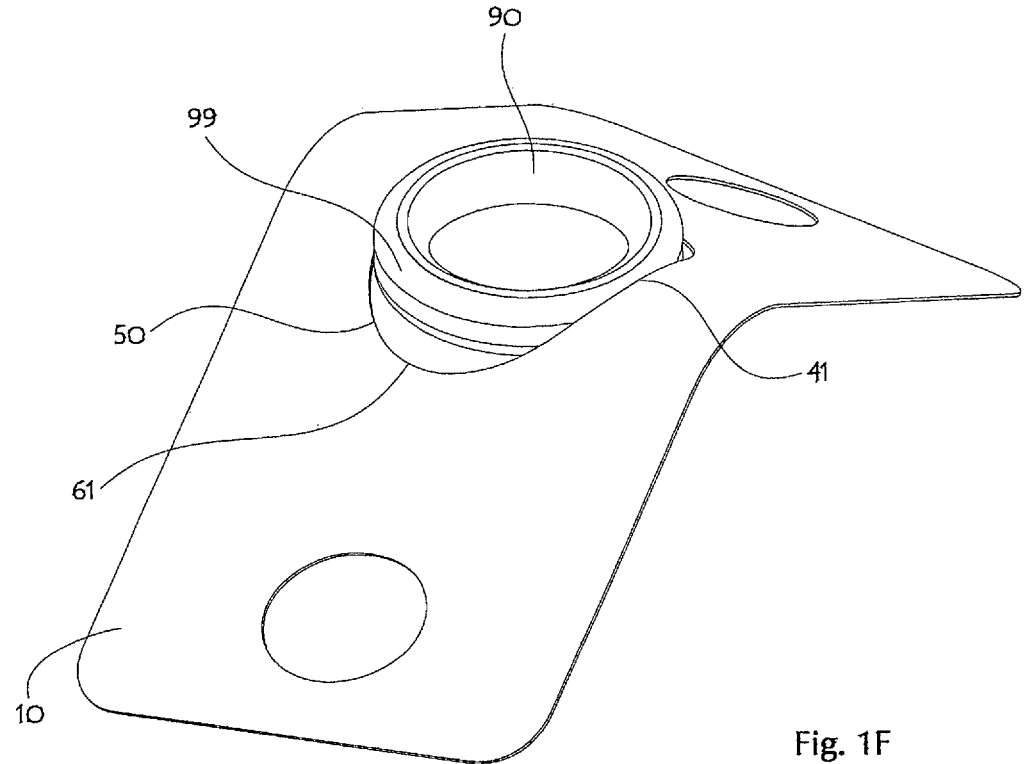
FIG. 1F is a perspective view illustrating a process for assembling the representative retainer illustrated in FIG. 1 with a known C-seal gasket.

A known gasket 90 may be inserted (as illustrated in FIG. 1F) into the representative retainer gasket-capturing aperture 50 by engaging the aperture smaller dimension internal edge 42 into the full depth of the gasket peripheral groove 91 (FIG. 1D), flexing the retainer material 10 in three dimen-sions and bringing the aperture larger dimension extremes 61, 62 toward each other while simultaneously distending the opposite smaller dimension internal edge 41 of the aperture to clear the maximum external diameter 99 of the gasket. The gasket 90 is then brought coplanar with the retainer portion 42 (not visible in FIG. 1F), already engaged in the gasket peripheral groove 91, and releases the flexure of the retainer material 10, thus allowing the opposite smaller dimension internal edge 41 of the gasket-capturing aperture 50 to also engage the gasket peripheral groove 91. The gasket retention particulars may be more fully under-stood by considering the FIG. 1D cross-section view, show-ing the oppositely located smaller dimension internal edges 41, 42 projecting well into the gasket peripheral groove 91. The removability of the gasket may be more fully under-stood by considering the FIG. 1E cross-section view show-ing the oppositely located larger dimensional internal edges 61, 62 substantially away from the maximum external diameter 99 of the gasket.

Figure 3:
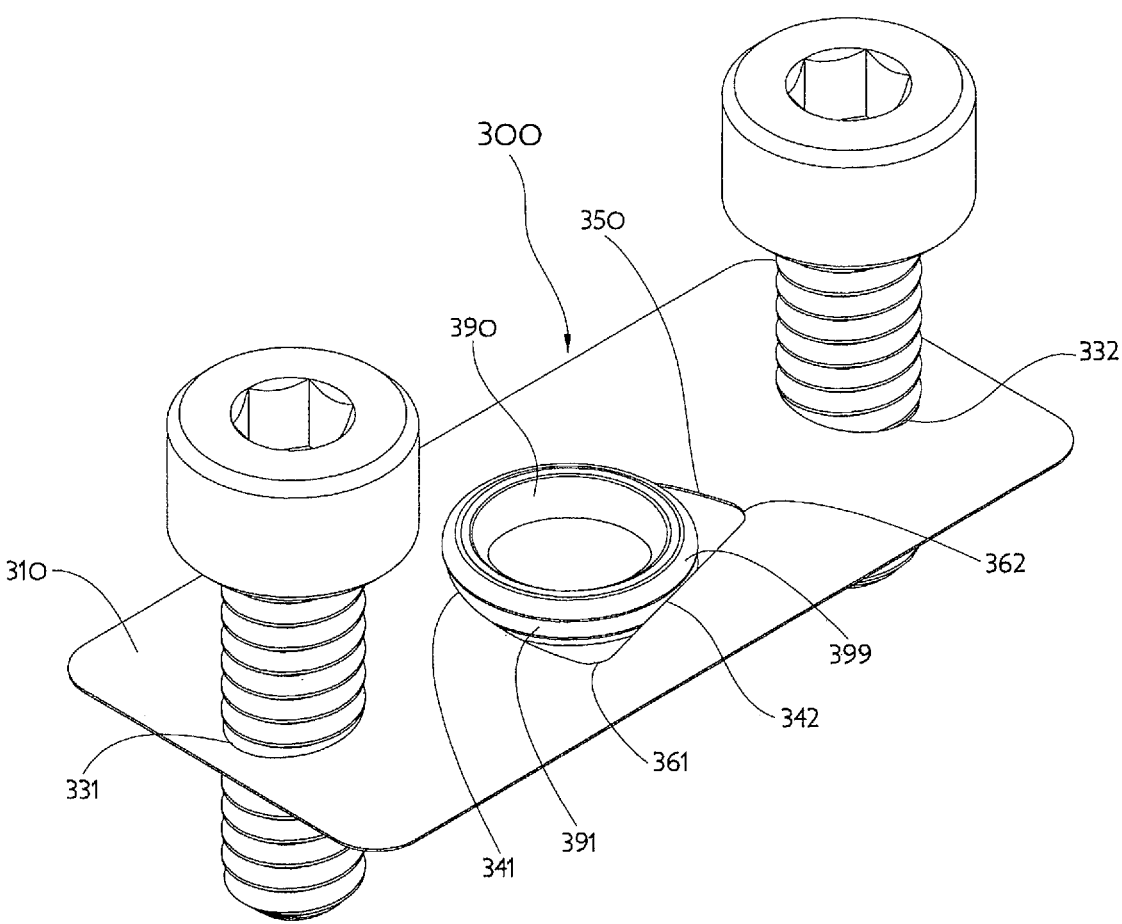
FIG. 3 is a perspective view of a retainer with a D-shaped gasket-capturing aperture.

An example of another embodiment of the inventive gasket retainer is illustrated in FIG. 3 in perspective view, with a removably captured C-seal type gasket. The retainer 300 is made from a thin flat rectangular member 310 of sheet material. The representative retainer 300 has a D-shaped gasket-capturing aperture 350 with a C-seal gasket 390, of known construction, removably retained and a pair of fas-tener apertures 331, 332 generally located adjacent diametri-cally opposite sides of the gasket. Skilled designers will appreciate the perimeter of this D-shaped aperture is essen-tially half of a larger ellipse which is truncated along its minor axis by a straight portion 342 blended into corner curves 361, 362 of suitable radius. The gasket 390 may be inserted into the representative retainer gasket-capturing aperture 350 by engaging the ellipse tight radius portion 341 into the full depth of the gasket peripheral groove 391, flexing the retainer material 310 in three dimensions. This brings the ellipse-truncating corners 361, 362 toward each other, while simultaneously distending the aperture straight portion edge 342 to clear the maximum external diameter 399 of the gasket. Then, the gasket 390 is brought to an orientation coplanar with the retainer portion 341, already engaged in the gasket peripheral groove 391, and releasing the flexure of the retainer material 310 to thereby allow the aperture straight portion edge 342 to also engage the gasket peripheral groove 391.

Figure 7A:
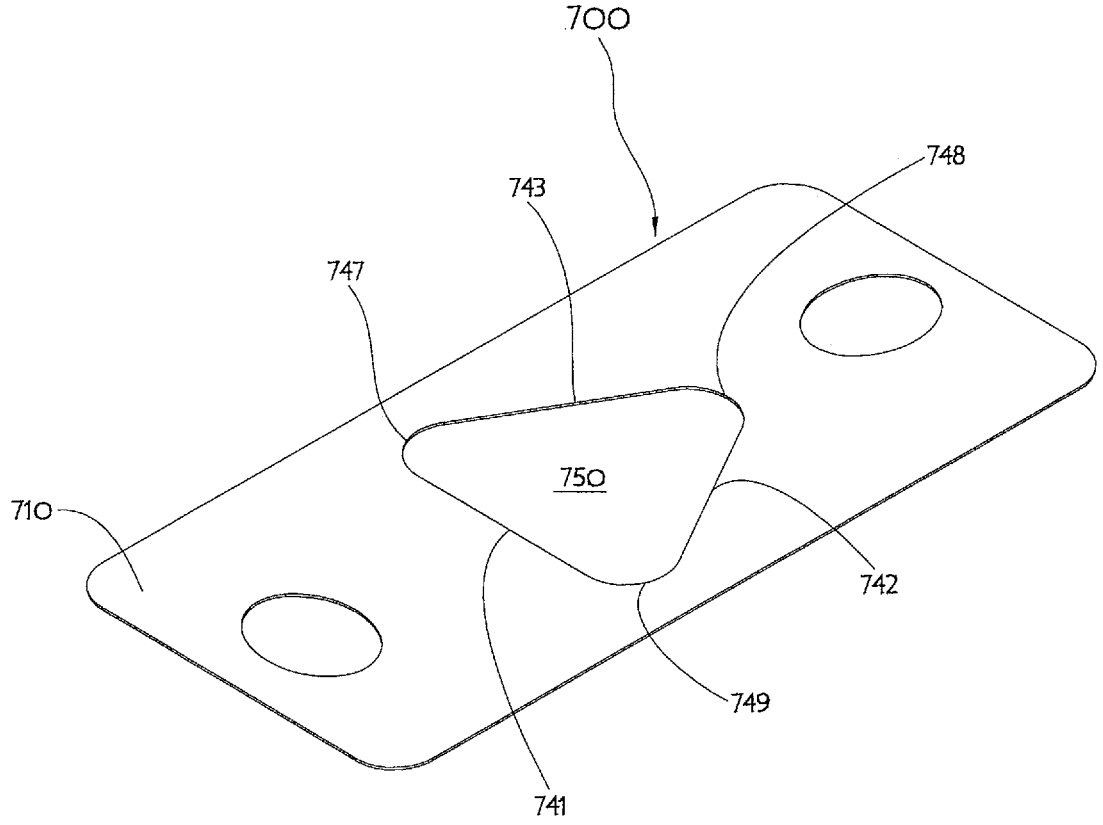
FIG. 7A is a perspective view of a retainer with a triangular gasket-capturing aperture.

Yet another embodiment of the inventive gasket retainer is illustrated in FIG. 7A, shown, for clarity, in perspective view with no associated other hardware. The retainer 700 is made from a thin flat member 710 of sheet material. The representative retainer 700 has a gasket-capturing aperture 750, with a smoothly non-convex outline wherein three identically shaped periphery portions 741, 742, 743 are substantially straight and appear as an equilateral triangle with convenient radii 747, 748, 749 in place of the corre-sponding vertices. A gasket (not shown) may be inserted into the representative retainer gasket-capturing aperture 750 by engaging a pair of adjacent straight portions 741, 742 into the full depth of a gasket peripheral groove (not shown). This insertion causes the retainer material 710 to flex in three dimensions, thus bringing the corresponding distal radii 747, 748 toward each other while simultaneously distending the third straight portion edge 743 to clear the maximum exter-nal diameter (not shown) of the gasket. This action further brings the gasket coplanar with the gasket-capturing aper-ture portions 741, 742 already engaged in the gasket periph-eral groove, while releasing the flexure of the retainer material 710, allowing the third aperture straight portion edge 743 to also engage the gasket peripheral groove.

Figure 7B:
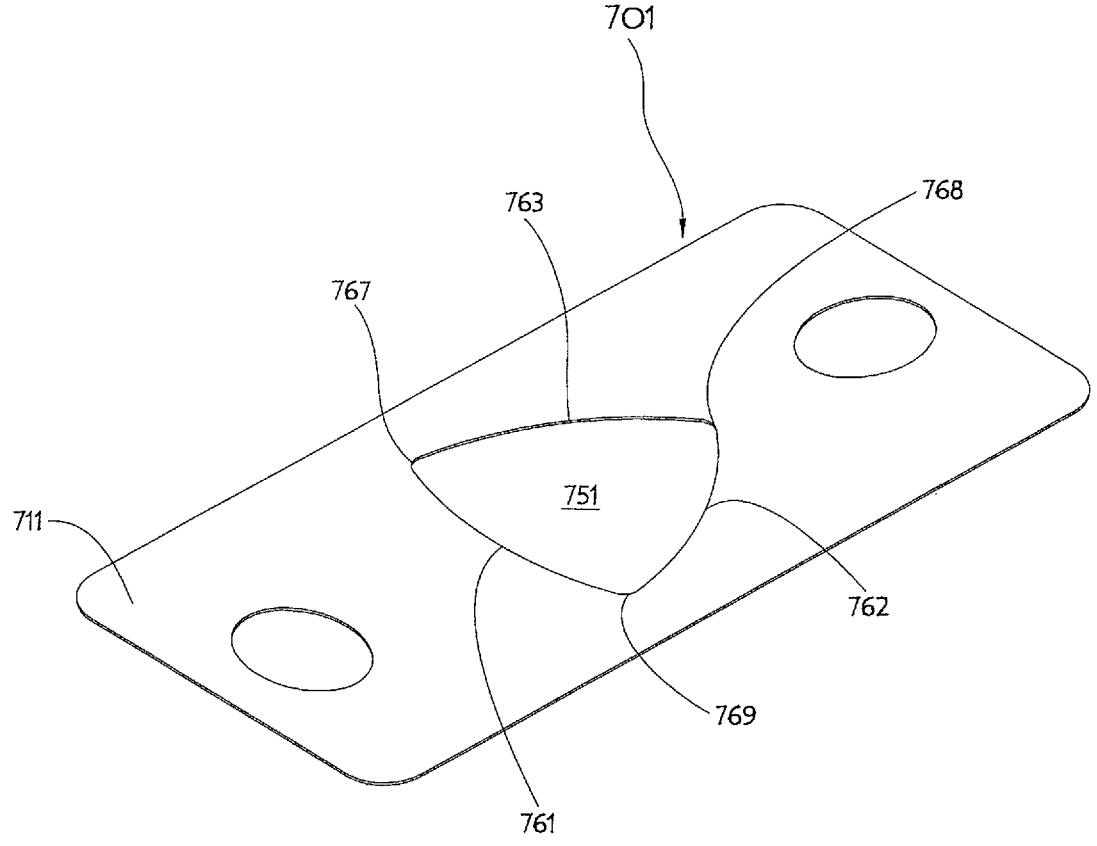
FIG. 7B is a perspective view of a retainer with a tri-oval gasket-capturing aperture.

Yet a further embodiment of an inventive design gasket retainer is illustrated in FIG. 7B, in perspective view with no associated other hardware, for clarity. The retainer 701 is made from a thin flat member 711 of sheet material. The retainer 701 has a gasket-capturing aperture 751 with a smoothly non-convex outline, wherein three identically-shaped periphery portions 761, 762, 763 of relatively large curvature appear as a Reuleaux triangle, with convenient radii 767, 768, 769 in place of the corresponding vertices, similar to the tri-oval form of motor vehicle racing course. A gasket (not shown), of known construction, may be inserted into the representative retainer gasket-capturing aperture 751 by engaging a pair of adjacent straight portions 761, 762 into the full depth of a gasket peripheral groove (not shown). This insertion flexes the retainer material 711 in three dimensions to bring the corresponding distal radii 767, 768 toward each other while simultaneously distending the third straight portion edge 763 to clear the maximum external diameter (not shown) of the gasket. This action, in turn, brings the gasket coplanar with the gasket-capturing aperture portions 761, 762 already engaged in the gasket peripheral groove, while releasing the flexure of the retainer material 711, allowing the third aperture straight portion edge 763 to also engage the gasket peripheral groove.

Skilled designers will appreciate that the perimeter shape of the inventive oblong non-convex (when viewed from inside the aperture looking outward) gasket-capturing aperture need not have continuously changing curvature as defined by an ellipse. A suitably truncated mere portion of an ellipse may be sufficient to form a functional aperture, as can be observed with the D-shaped aperture illustrated in FIG. 3. A functional aperture may also, for example, be formed from short circular arc segments joined by straight lines, in which instance a triangle with curved corners provides an extreme case as can be observed with the aperture illustrated in FIG. 7A. In the case of a generally tri-oval aperture as illustrated in FIG. 7B, or even an aperture of oval outline as in FIG. 1C, the arc segments may have different radii or may all be nominally the same. In addition to the flexibility and spring properties of the retainer thin flat sheet material, ensuring the gasket capturing aperture has a major dimension sufficiently large to allow passage of a C-seal type gasket turned on edge, and minor dimension sufficiently small to engage a cavity or groove on the outside diameter periphery of the C-seal type gasket, are primary retainer design considerations. The larger major dimension is necessary to allow initial engagement of the gasket peripheral groove with an aperture edge and the smaller minor dimension is necessary to retain the gasket after it is inserted.

Figure 4:
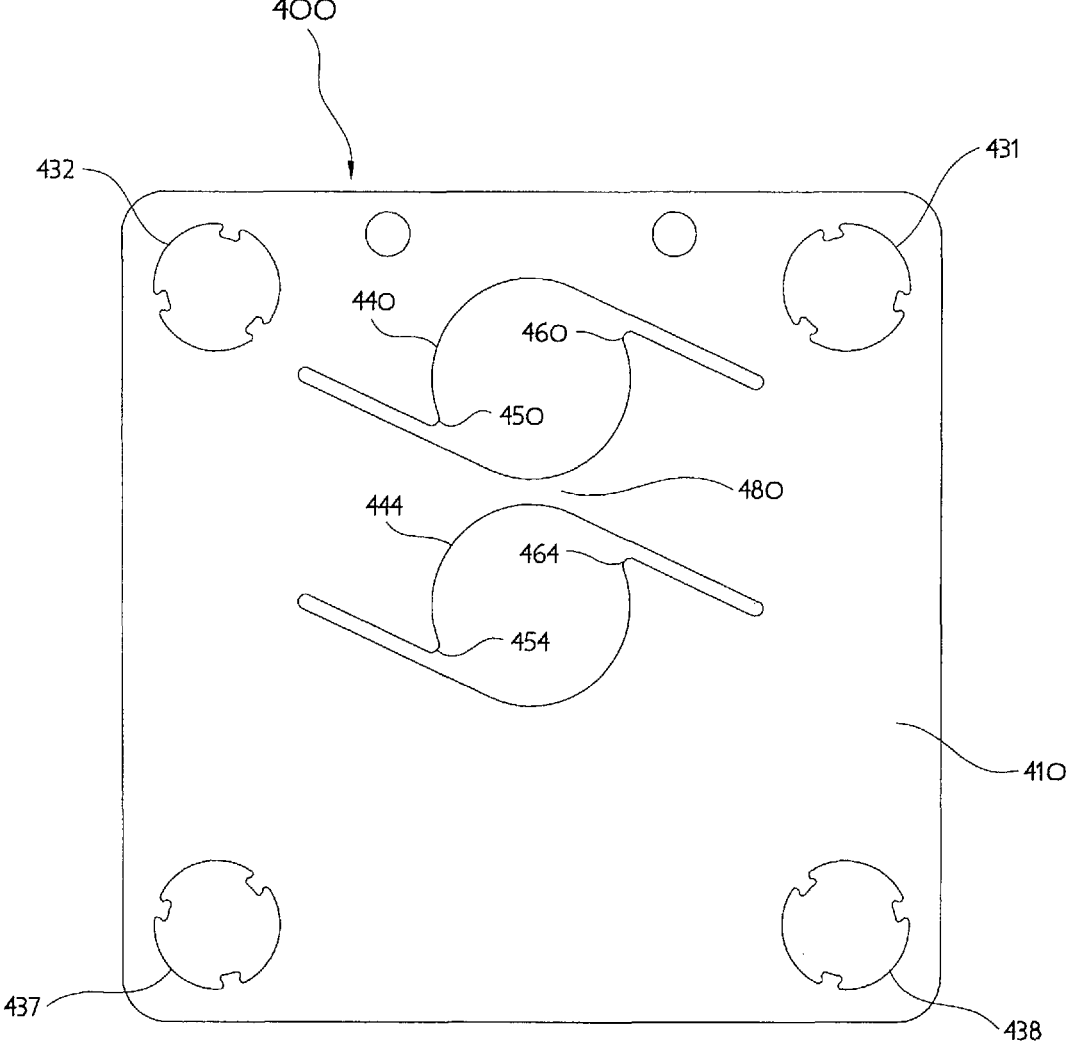
FIG. 4 is a perspective view of a commercially available prior art retainer.

Consideration of any retainer described in the background portion of this application, including the retainer commercially available from Microflex Technologies (Anaheim, CA; www.microflexseals.com) illustrated in FIG. 4 of this disclosure, reveals that these designs all have one or more small sharp locally convex features prone to snagging during handling and all lack the benign concavity of the instant invention.

Skilled designers will further appreciate the utility of having fastener apertures in a gasket retainer designed to engage a threaded portion of fasteners present, to thereby generally hold the fasteners and retainer together as an interim subassembly. This makes easier the fluid pathway joining process. Any aperture shape suited to a gasket-capturing aperture may also be used for a fastener aperture after appropriate dimensional scaling. Thus, an exemplary fastener aperture may be an oval, an ellipse, D-shaped, triangular or tri-oval. Any combinations of the foregoing aperture choices may be used in a particular retainer design.

As noted above, the first retainer embodiment 100 illustrated in FIG. 1A has a pair of oblong fastener apertures 31, 32 located adjacent diametrically opposite sides of the gasket capturing aperture 50. As illustrated in FIG. 2A, the right fastener aperture 31 has a smoothly concave shape of oval outline, with a major diameter 35 sufficiently large to allow passage of a fastener thread outside diameter and a minor diameter 33 sufficiently small to engage the fastener thread without binding at the thread root. The fastener aperture axes 33, 35 may also be advantageously rotated with respect to the coordinate system of the thin flat rectangular member 10 to accommodate other design considerations such as material web width, etc. As illustrated in FIG. 2B the left fastener aperture 32 similarly has a smoothly concave shape of oval outline with a major diameter 36 sufficiently large to allow passage of a fastener thread outside diameter and a minor diameter 34 sufficiently small to engage the fastener thread without binding at the thread root. The major axes 35, 36 of the two fastener apertures are at right angles to each other but any other relative relationship may be chosen by the designer as desired.

Figures 2D, 2E:
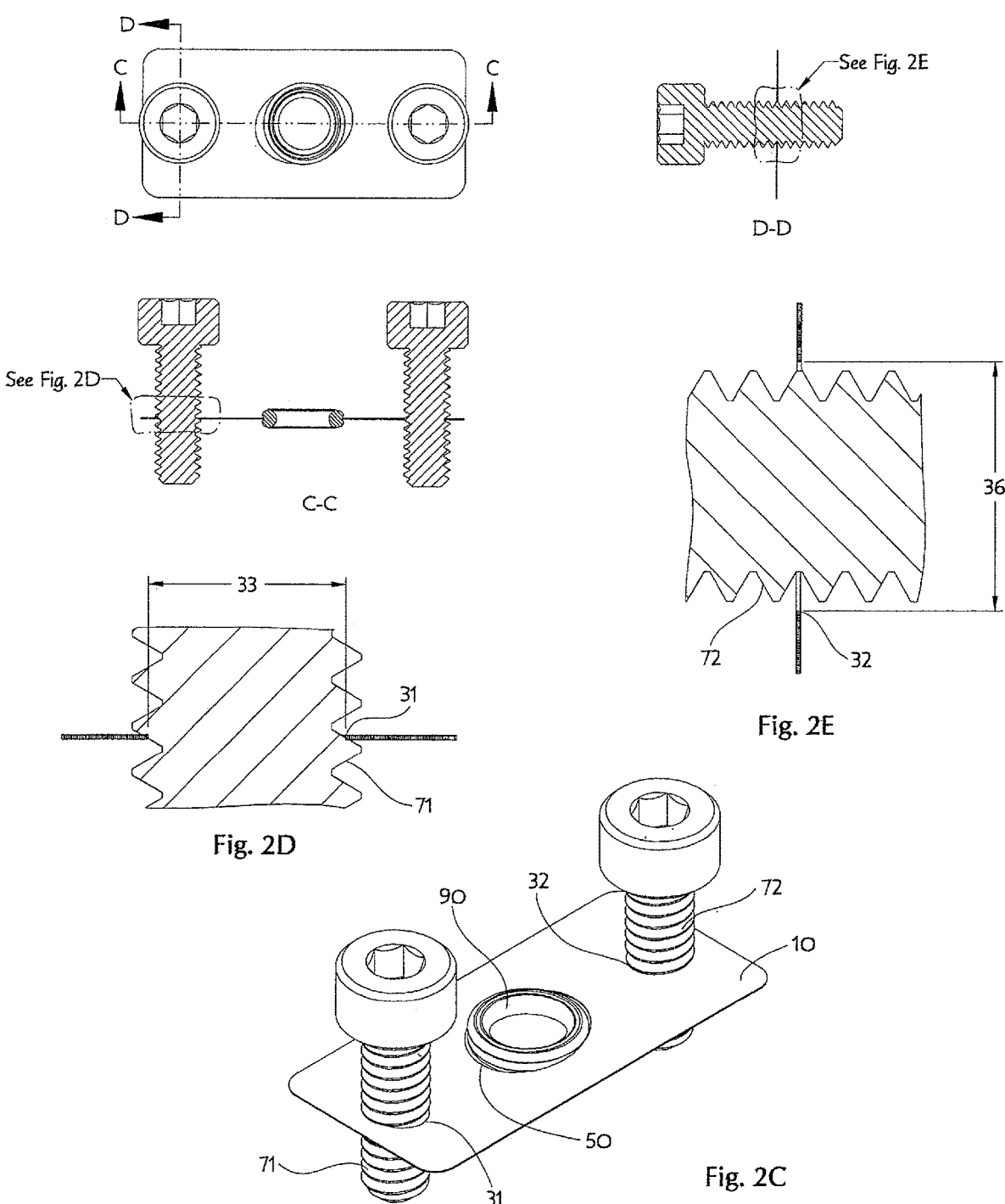
FIG. 2D is a cross-section detail through one fastener aperture illustrated in FIG. 2C.
FIG. 2E is a cross-section detail through another fastener aperture illustrated in FIG. 2C.

The inventor has discovered that a fastener aperture 31, 32 with a larger dimension of 0.178 inch and a smaller dimension of 0.142 inch functions well while accommodating both UNC-#8-32 and also M4×0.7 male threads. A true mathematical ellipse may conveniently describe the fastener aperture 31, 32 when computer aided design (CAD) methods are used. An ellipse with the major axis sized approximately one and a quarter (1.25=125%) times the minor axis dimension corresponds to the representative fastener apertures 31, 32 illustrated in FIG. 2A and FIG. 2B. A typical process for engaging an externally threaded (male) fastener portion 71, 72 with a fastener aperture 31, 32 involves rotating the fastener along the thread axis to allow it to mesh with the fastener aperture minor dimension 33, 34 as if it were a mating (female) internal thread. In the first retainer embodiment 100, the relationship among fasteners 71, 72, gasket 50, and the retainer rectangular member 10 may be further understood by considering a perspective view of the assembled items as illustrated in FIG. 2C, wherein fluid pathway elements are left out of the illustration for clarity. The cross-sectional detail in FIG. 2D shows how the minor diameter 33 of the fastener aperture 31 engages approximately the pitch diameter of one inserted externally threaded fastener 71. The cross-sectional detail in FIG. 2E shows how the major diameter 36 of the fastener aperture 32 is sufficiently large to clear the major diameter of another inserted externally threaded fastener 72.

Figure 5:
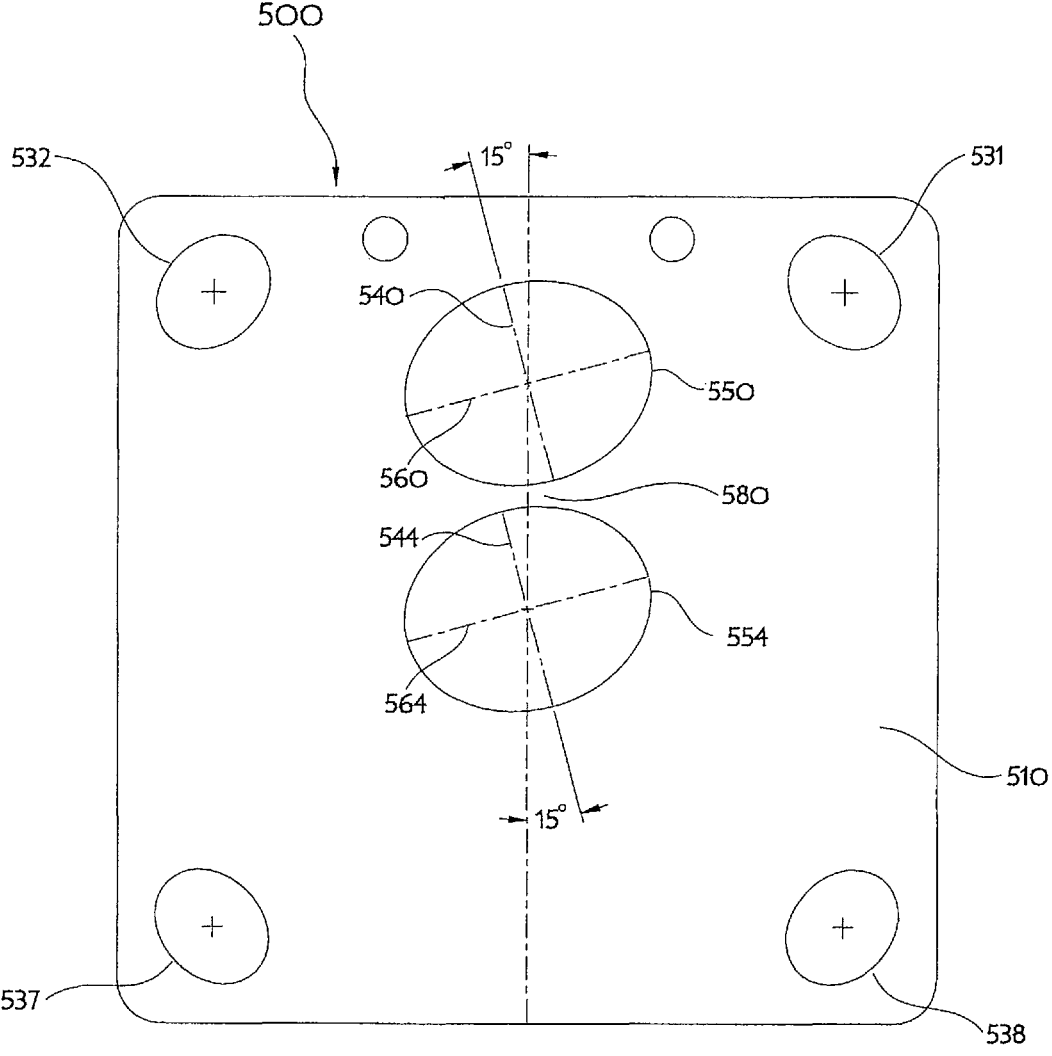
FIG. 5 is a plan view of a retainer for a two-port surface mount fluid delivery component.

Surface mount fluid delivery system components with multiple fluid conduit ports are well known and the inventive gasket retainer with multiple gasket-capturing apertures will benefit from an appropriate aperture orientation. Illustrated in FIG. 5 is a plan view of a retainer 500 for use with a two-port surface mount K1S style fluid delivery component. The retainer 500 is made from a thin flat square member 510 of sheet material having two oblong gasket-capturing apertures 550, 554 for use with known C-seal gaskets (not shown), and four fastener apertures 531, 532, 537, 538 in locations corresponding to the corner mounting holes of a valve or similar component. The sheet material is typically 0.0030(+/−0.0002)-inch thick full hard 300-series stainless steel and the square shape is approximately 1.115-inch by 1.115-inch. Of course, these dimensions are exemplary only, and not required to implement the inventive concepts. Each gasket-capturing aperture 550, 554 has a major axis 560, 564 nominally dimensioned 0.340 inch and a minor axis 540, 544 nominally dimensioned 0.272 inch, similar to the previously discussed single-gasket retainer 100. Inappropriate orientation of the adjacent gasket-capturing apertures 550, 554 could result in mutual intersection and loss of the intervening material web 580 between them because the fluid conduit ports are typically spaced 0.305-inch apart. The inventor has discovered that rotating each gasket-capturing aperture 550, 554 approximately 15 degrees in the same direction provides a desirable improvement of the intervening material web 580 width compared to merely aligning the minor axes 540, 544. Additional handling benefits occur because the corresponding aperture axes 550, 554 and 560, 564 are made simply parallel rather than collinear. Consequently, inserting one gasket is less likely to disturb the retention of an adjacent gasket.

Figure 6:
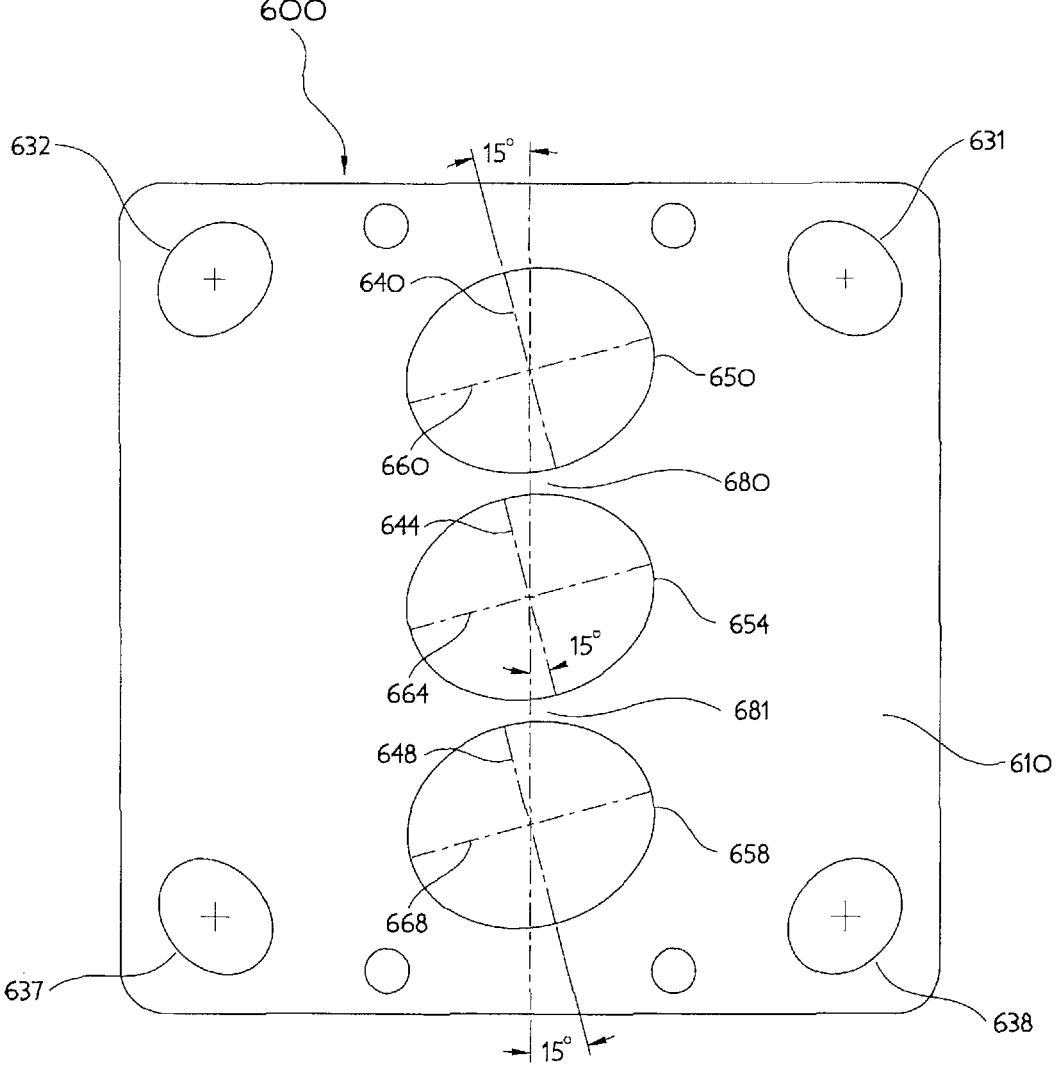
FIG. 6 is a plan view of a retainer for a three-port surface mount fluid delivery component.

Illustrated in FIG. 6 is a plan view of another embodiment of a retainer 600 for use with a three-port surface mount K1S style fluid delivery component. The retainer 600 is made from a thin flat square member 610 of sheet material having three oblong gasket-capturing apertures 650, 654 for use with known C-seal gaskets (not shown), and four fastener apertures 631, 632, 637, 638 in locations corresponding to the corner mounting holes of a valve or similar component. The sheet material is typically 0.0030 (+/−0.0002)-inch thick full hard 300-series stainless steel and the square shape is approximately 1.115-inch by 1.115-inch. Each gasket-capturing aperture 650, 654, 658 has a major axis 660, 664, 668 nominally dimensioned 0.340-inch and a minor axis 640, 644, 648 nominally dimensioned 0.272-inch similar to the previously discussed retainer 100. Inappropriate orientation of the adjacent gasket-capturing apertures 650, 654, 658 could result in mutual intersection and loss of the intervening material webs 680, 681 between them because the fluid conduit ports are typically spaced 0.305-inch apart. The inventor has discovered that rotating each gasket-capturing aperture 650, 654, 658 approximately 15-degrees in the same direction provides a desirable improvement of the intervening material web 680, 681 widths compared to merely aligning the minor axes 640, 644, 648. Additional handling benefits occur because the corresponding aperture axes 650, 654, 658 and 660, 664, 668 are made simply parallel rather than collinear and consequently inserting one gasket is less likely to disturb the retention of an adjacent gasket.

Figures 8A, 8B:
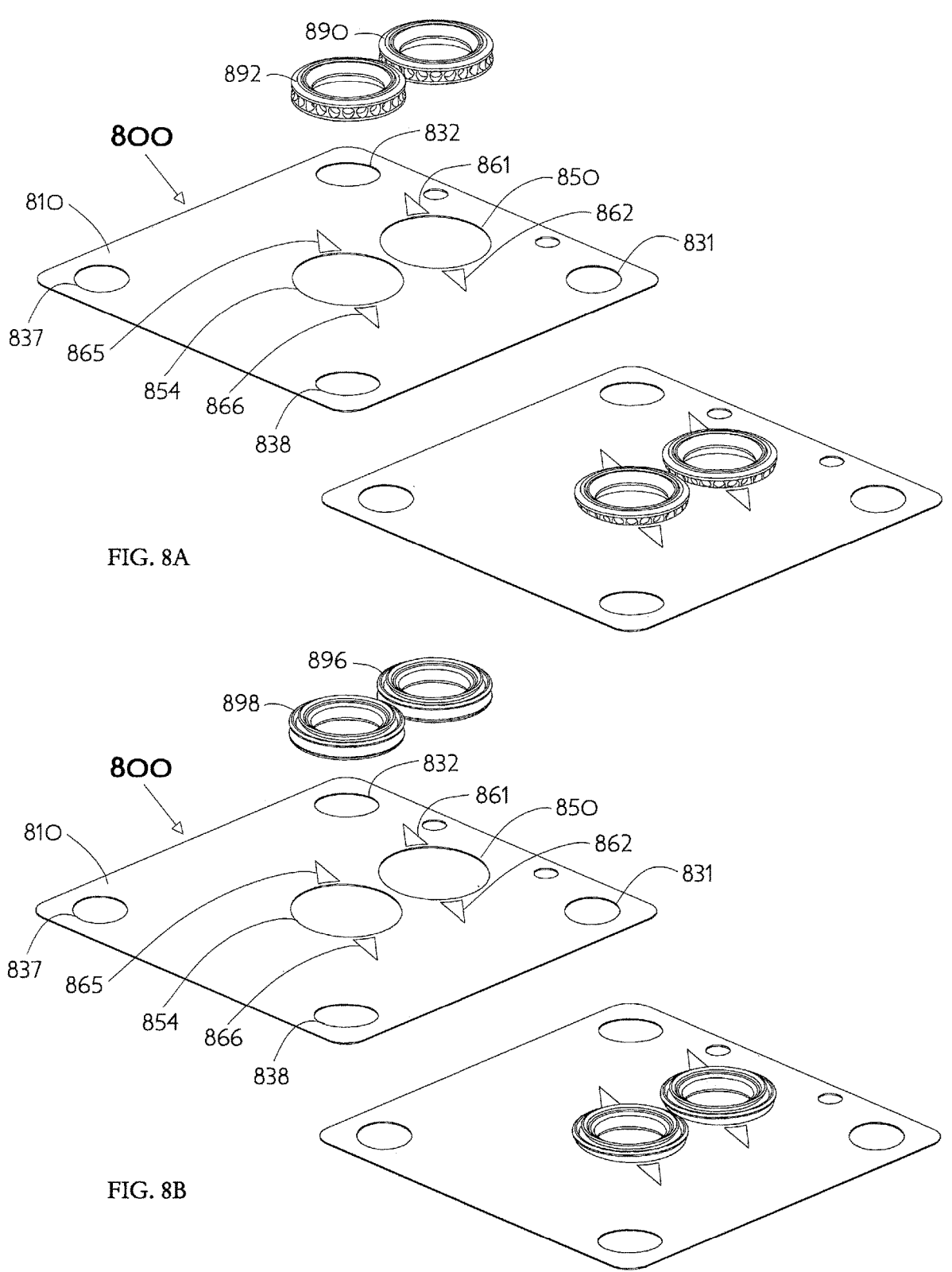
FIG. 8A shows exploded and assembled perspective views of another retainer for use with a two-port surface mount fluid delivery component and a gasket type.
FIG. 8B shows exploded and assembled perspective views of the another retainer for use with a two-port surface mount fluid delivery component and another gasket type.

Illustrated in FIG. 8A are exploded and assembled perspective views of another retainer 800 for use with a two-port surface mount K1S style fluid delivery component which is nearly identical to the previously described dual-gasket retainer 500. The retainer 800 is made from a thin flat square member 810 of sheet material having two oblong gasket-capturing apertures 850, 854 for use with known C-seal gaskets 890, 892 as described in U.S. Pat. No. 6,357,760 issued to Doyle. Four fastener apertures 831, 832, 837, 838 are placed in locations corresponding to the corner mounting holes of a valve or similar component (similar to the further illustration in FIG. 12A FIG. 12C discussed below). The sheet material 810 is typically 0.0030(+/−0.0002)-inch thick full hard 300-series stainless steel and the square shape is approximately 1.115-inch by 1.115-inch. Of course, these dimensions are exemplary only, and not required to implement the inventive concepts. Each elliptical gasket-capturing aperture 850, 854 has a major axis nominally dimensioned 0.340 inch and a minor axis nominally dimensioned 0.272 inch, similar to the previously discussed retainers 100, 500. Indicia shown as triangles 861, 862, 865, 866 are formed on the surface of the sheet material 810 to indicate the orientation of each major axis helping technicians recognize how to insert removable gaskets 890, 892. Other indicia shapes, such as thin lines for example, may of course be substituted and any suitable clean permanent marking method, such as etching or laser scribing, used to form the indicators. Illustrated in FIG. 8B are exploded and assembled perspective views of the same other retainer 800 with alternative known C-seal gaskets 896, 898 as described in U.S. Pat. No. 9,739,378 issued to the present inventor Kim Ngoc Vu. It is important to recognize the inventive retainer is a reusable item, suited to use with many different gaskets, which may be considered an accessory to a surface mount fluid delivery component (as discussed in the illustrations of FIG. 12A-FIG. 12C further below).

Figure 9A:
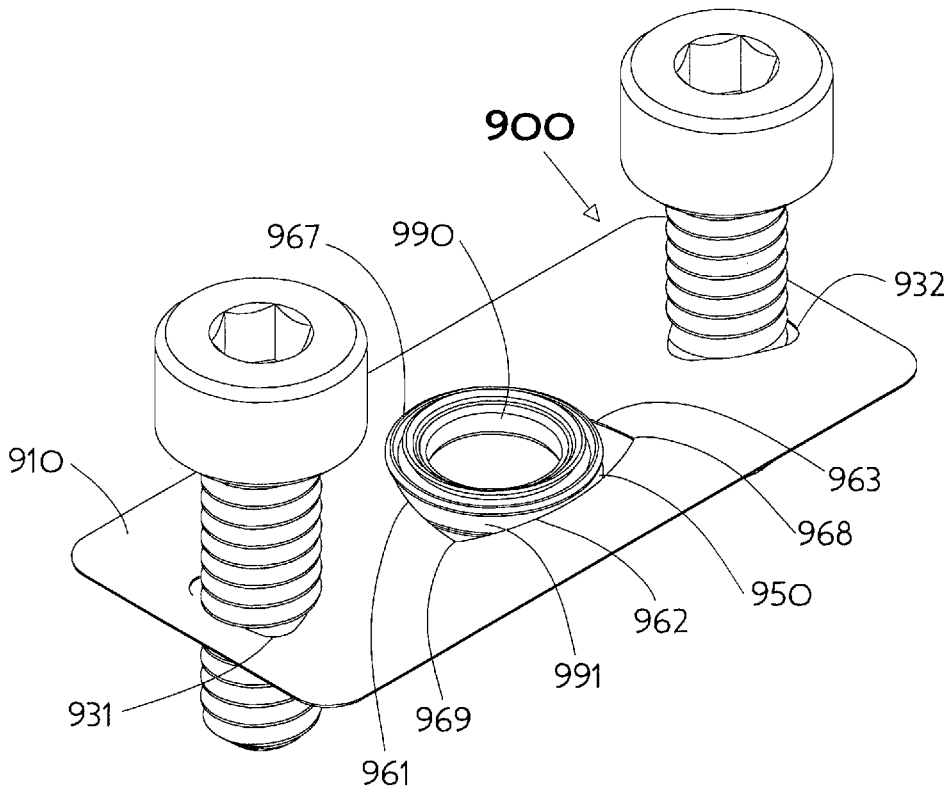
FIG. 9A is a perspective view of another retainer with modified tri-oval gasket-capturing aperture including fasteners and a single gasket.
Figure 9B:
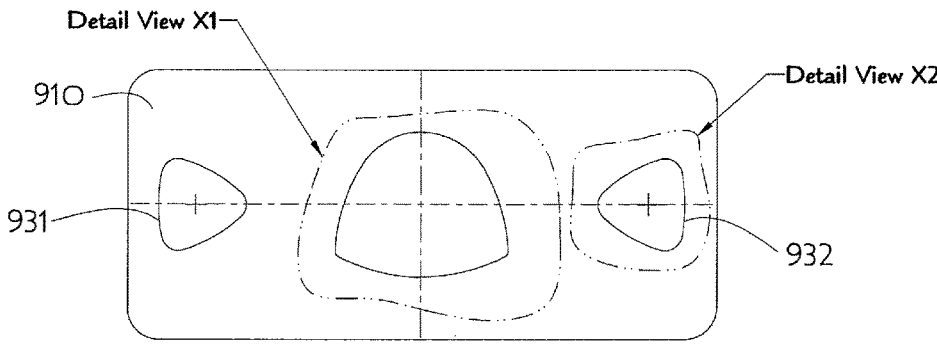
FIG. 9B shows plan views of features in the single-gasket retainer of FIG. 9A.
Figure 9B:
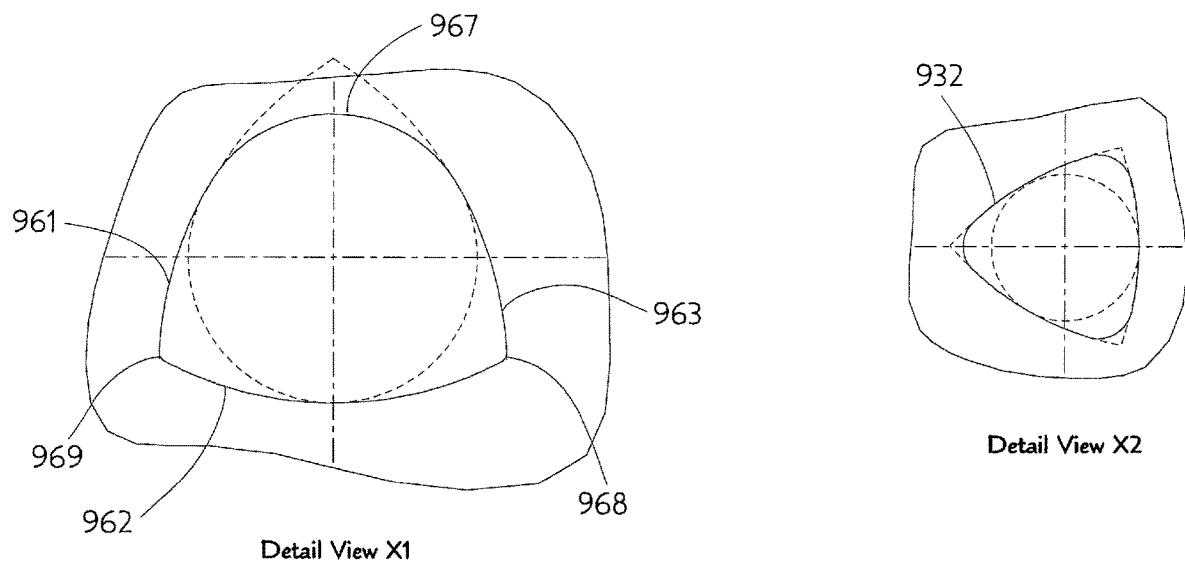
Figure 9B:
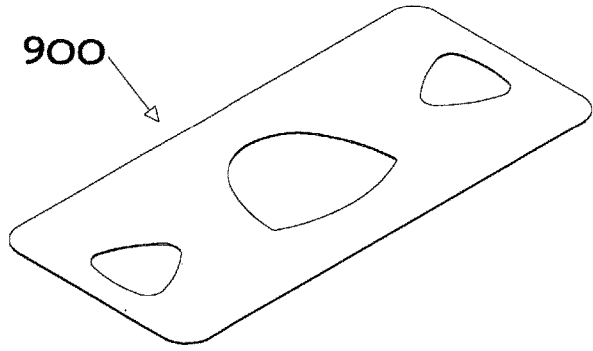

An example of another embodiment of the inventive gasket retainer is illustrated in FIG. 9A in perspective view with a removably captured C-seal type gasket. The retainer 900 is made from a thin flat rectangular member 910 of sheet material. The representative retainer 900 has a modified tri-oval gasket-capturing aperture 950 with a C-seal gasket 990, of known construction, removably retained and a pair of fastener apertures 931, 932 generally located adjacent diametrically opposite sides of the gasket. Skilled designers will appreciate the perimeter of this modified tri-oval aperture 950 (as further revealed in FIG. 9B) is effectively comprised of a medium radius corner 967 matching the diameter of the maximal circle enclosed by a Reuleaux triangle defined by three large radius portions 961, 962, 963 which are blended into corner curves 968, 969 of suitably small radius. The gasket 990 may be inserted into the representative retainer gasket-capturing aperture 950 by engaging the medium radius portion 967 into the full depth of the gasket peripheral groove 991 while flexing the retainer material 910 in three dimensions. This action brings the ellipse-truncating corners 968, 969 toward each other, while simultaneously distending the intervening large radius aperture portion 962 to clear the maximum external diameter of the gasket. Then, the gasket 990 can be brought to an orientation coplanar with the retainer tight radius portion 967 already engaged in the gasket peripheral groove 991, and releasing the flexure of the retainer material 910 thereby allows the aperture large radius portion 962 to also engage the gasket peripheral groove 991.

Figure 10:
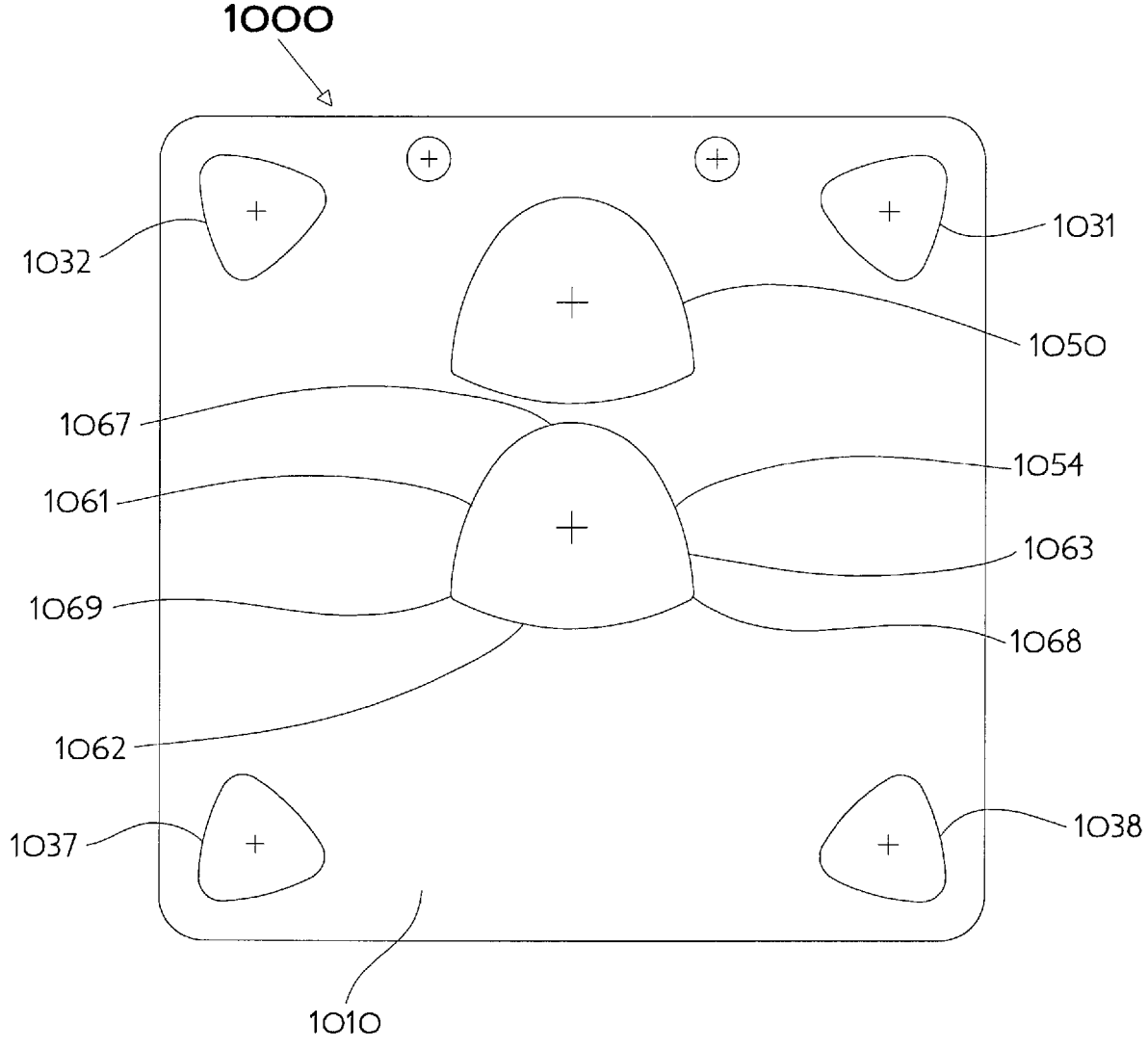
FIG. 10 shows a plan view of a dual-gasket retainer having modified tri-oval gasket-capturing apertures.

Another example of the inventive gasket retainer is illustrated in FIG. 10 showing a plan view of a retainer 1000 for use with a two-port surface mount K1S style fluid delivery component. The retainer 1000 is made from a thin flat square member 1010 of sheet material having two modified tri-oval gasket-capturing apertures 1050, 1054 for use with known C-seal gaskets (not shown), and four tri-oval shaped fastener apertures 1031, 1032, 1037, 1038 in locations corresponding to the corner mounting holes of a valve or similar component. The sheet material is typically 0.0030(+/−0.0002)-inch thick full hard 300-series stainless steel and the square shape is approximately 1.115-inch by 1.115-inch. Of course, these dimensions are exemplary only, and not required to implement the inventive concepts. A typical modified tri-oval gasket-capturing aperture 1054 is comprised of three large radius portions 1061, 1062, 1063 joined together by two small radius corner curves 1068, 1069 thereby defining the boundary of a Reuleaux triangle with a medium radius corner 1067 substituted therein. The medium radius corner 1067 size is chosen to engage a gasket peripheral groove (not shown) as previously described in the example of a similar single-gasket retainer 900 illustrated in FIG. 9A-9B.

Figure 11:
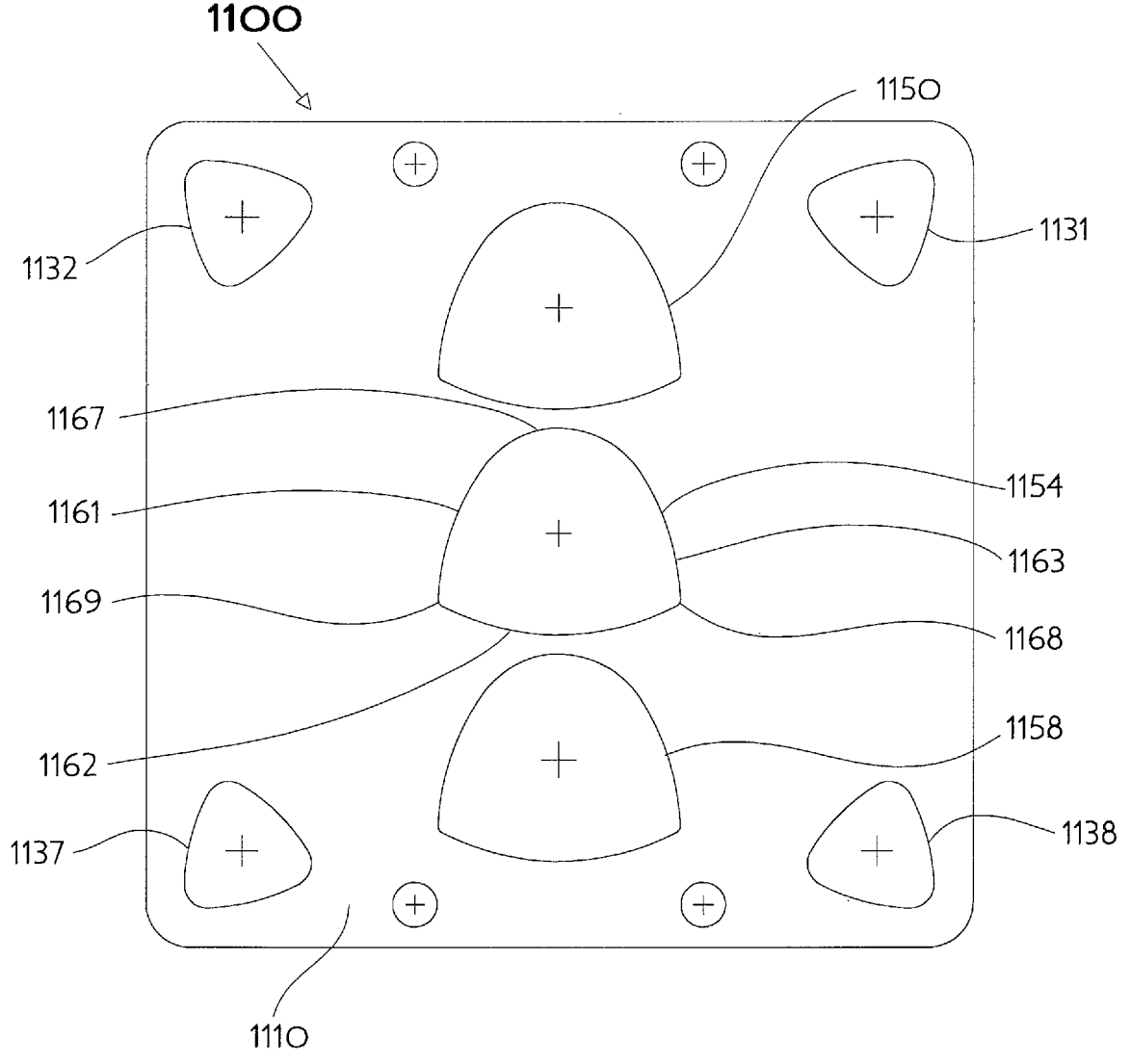
FIG. 11 shows a plan view of a triple-gasket retainer having modified tri-oval gasket-capturing apertures.

Another example of the inventive gasket retainer is illustrated in FIG. 11 showing a plan view of a retainer 1100 for use with a three-port surface mount K1S style fluid delivery component. The retainer 1100 is made from a thin flat square member 1110 of sheet material having three modified tri-oval gasket-capturing apertures 1150, 1154, 1158 for use with known C-seal gaskets (not shown), and four tri-oval shaped fastener apertures 1131, 1132, 1137, 1138 in locations corresponding to the corner mounting holes of a valve or similar component. The sheet material is typically 0.0030 (+/−0.0002)-inch thick full hard 300-series stainless steel and the square shape is approximately 1.115-inch by 1.115-inch. Of course, these dimensions are exemplary only, and not required to implement the inventive concepts. A typical modified tri-oval gasket-capturing aperture 1054 is comprised of three large radius portions 1161, 1162, 1163 joined together by two small radius corner curves 1168, 1169 thereby defining the boundary of a Reuleaux triangle with a medium radius corner 1167 substituted therein. The medium radius corner 1167 size is chosen to engage a gasket peripheral groove (not shown) as previously described in the example of a similar single-gasket retainer 900 illustrated in FIG. 9A-9B.

Figure 12A:
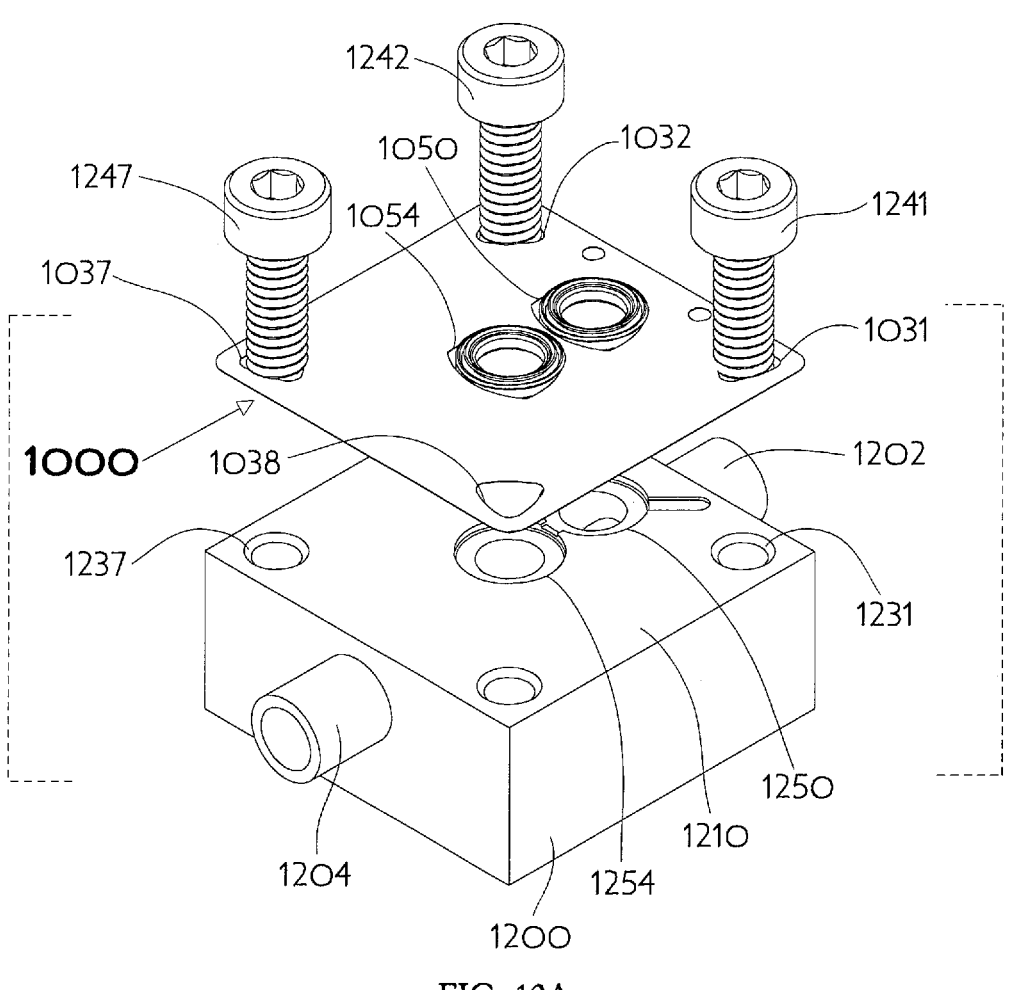
FIG. 12A shows a perspective exploded view of the FIG. 10 dual-gasket retainer (having two modified tri-oval gasket-capturing apertures) with inserted gaskets properly oriented above a representative two-port substrate.
Figure 12B:
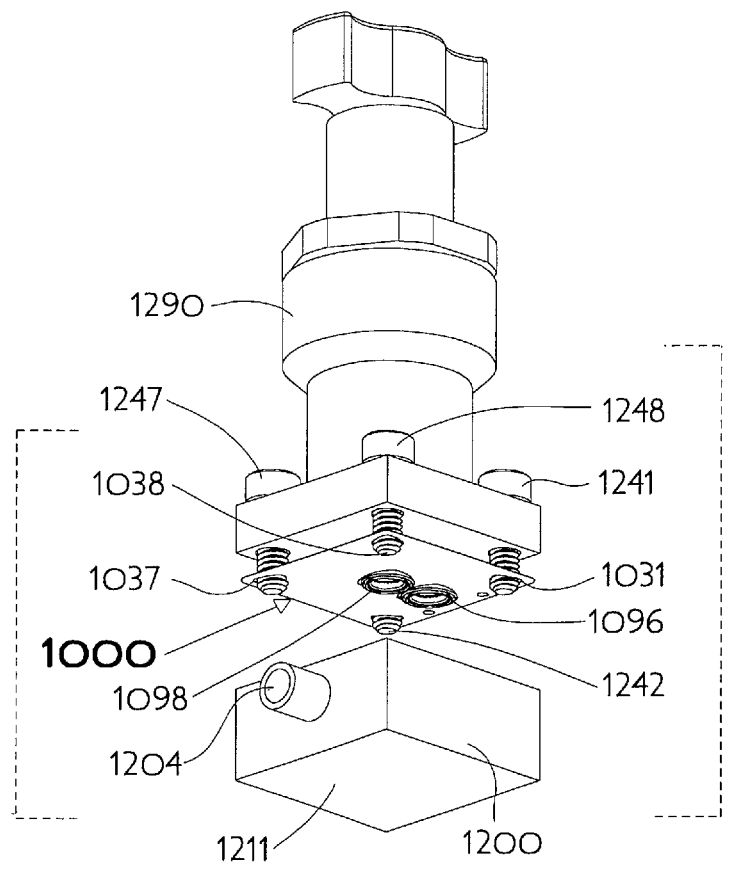
FIG. 12B shows a perspective exploded view of the FIG. 10 dual-gasket retainer seen from below a surface mount manual valve positioned for assembly upon the representative two-port substrate shown in FIG. 12A.
Figure 12C:
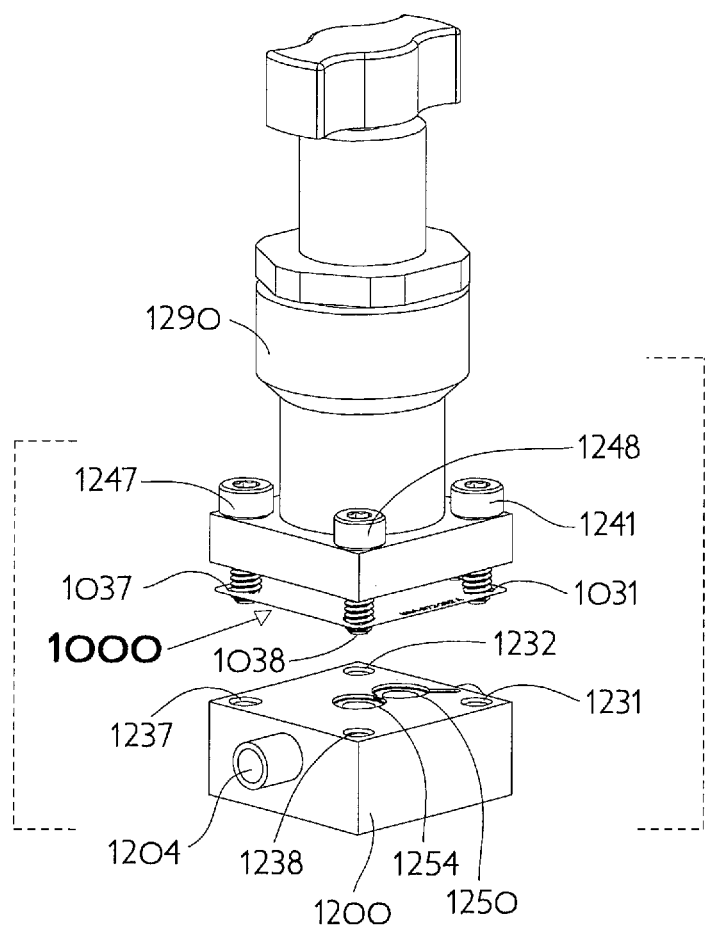
FIG. 12C shows a perspective exploded view of the FIG. 10 dual-gasket retainer seen from above the surface mount manual valve and two-port substrate shown in FIG. 12B.

The inventive retainer is a reusable item (as previously noted), suited to use with many different gaskets, and may be considered an accessory to a surface mount fluid delivery component as shown in the illustrations of FIG. 12A FIG. 12C. Illustrated in FIG. 12A is a perspective exploded view of the FIG. 10 dual-gasket retainer 1000 (having two modified tri-oval gasket-capturing apertures 1050, 1054) with inserted gaskets 1096, 1098 properly oriented above a representative two-port surface mount fluid delivery substrate 1200. The representative substrate 1200 has a first fluid conduit port 1250 located on a substrate top surface 1210 and fluidly connected to a first tube stub 1202 projecting from an adjacent substrate surface. The representative substrate 1200 has a second fluid conduit port 1254 also located on the substrate top surface 1210 and fluidly connected to a second tube stub 1204 projecting from another adjacent substrate surface. Four internally threaded component mounting holes 1231, 1232, 1237, 1238 are located near the corners of the generally square representative substrate 1200. The four tri-oval fastener apertures 1031, 1032, 1037, 1038 of the dual-gasket retainer 1000 are located to match the position of the component mounting holes. The two modified tri-oval gasket-capturing apertures 1050, 1054 are similarly located so as to position the inserted gaskets 1096, 1098 directly in alignment with the first 1250 and second 1254 fluid conduit ports. Thus, the specific location of apertures in a gasket retainer depends upon the geometry of the corresponding surface mount fluid delivery substrate 1200.

Illustrated in FIG. 12B is a perspective exploded view of the FIG. 10 dual-gasket retainer 1000 seen from below a surface mount manual valve 1290 positioned for assembly upon the representative two-port substrate 1200 shown in FIG. 12A. The representative valve 1290 has a first and a second fluid conduit port (neither visible since obscured by the retainer 1000) located to match the position of the corresponding first 1250 and second 1254 fluid conduit ports of the substrate 1200. Four fastener holes located near the corners of the generally square base portion of the representative valve 1290 accommodate externally threaded fasteners 1241, 1242, 1247, 1248 intended to engage the corresponding component mounting holes 1231, 1232, 1237, 1238 of the substrate 1200. The externally threaded fasteners 1241, 1242, 1247, 1248 fit through the corresponding tri-oval fastener apertures 1031, 1032, 1037, 1038 of the dual-gasket retainer 1000 which thereby positions the modified tri-oval gasket-capturing apertures 1050, 1054 to properly align the gaskets 1096, 1098 with the valve 1290 and substrate 1200 fluid conduit ports. Illustrated in FIG. 12C is the perspective exploded view of FIG. 12B as seen from above the surface mount manual valve 1290 and the two-port substrate 1200. When viewed from above, the underside of the valve 1290 is obscured, and the gaskets 1096, 1098 are not visible, however the fluid conduit ports 1250, 1254 of the substrate 1200 are visible.

Figure 13A:
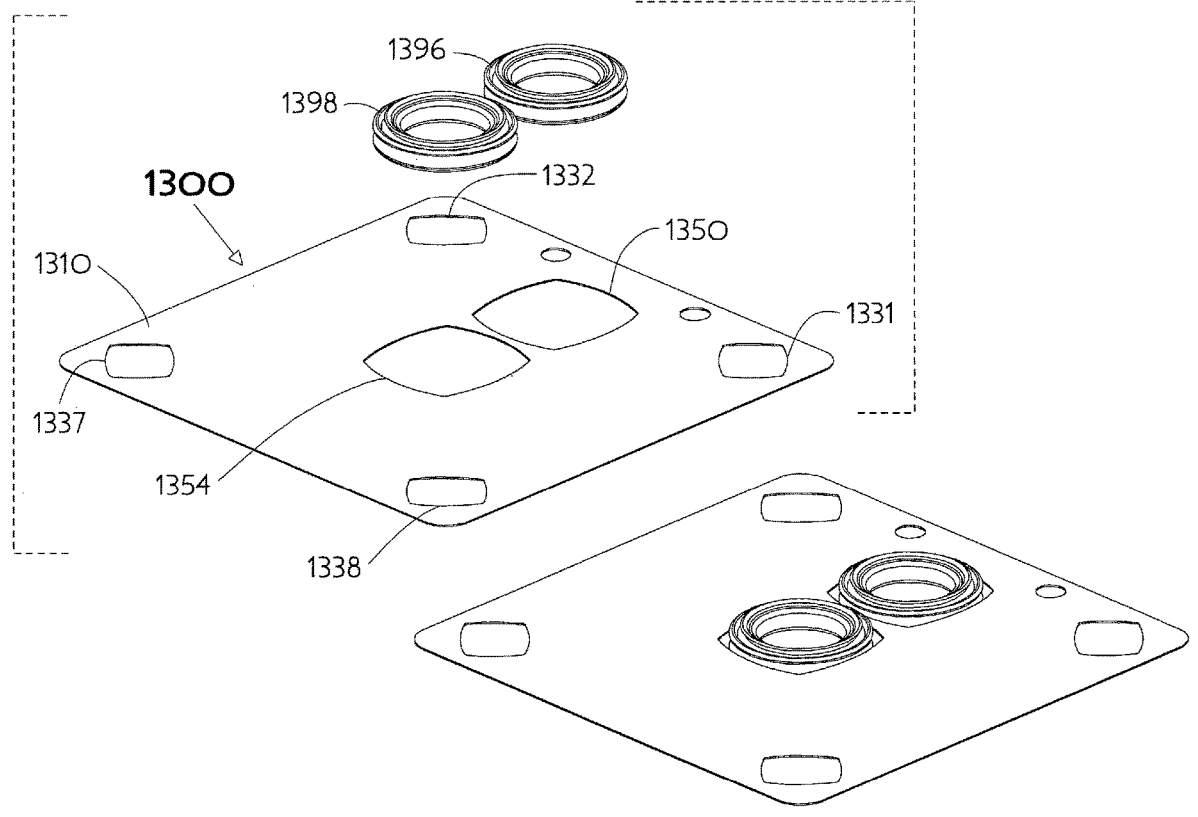
FIG. 13A shows exploded and assembled perspective views of another retainer for use with a two-port surface mount fluid delivery component and a gasket.

Illustrated in FIG. 13A are exploded and assembled perspective views of another retainer 1300 for use with a two-port surface mount K1S style fluid delivery component which is similar to the previously described dual-gasket retainers. The retainer 1300 is made from a thin flat square member 1310 of sheet material having two rectangular gasket-capturing apertures 1350, 1354 for use with known C-seal gaskets 1396, 1398 as described in U.S. Pat. No. 9,739,378 issued to the present inventor Kim Ngoc Vu. The rectangular gasket-capturing apertures 1350, 1354 are each comprised of four sides and resemble the outline of a cushion cut gemstone as will be described with reference to FIG. 13B below. Each rectangular cushion-shaped gasket-capturing aperture 1350, 1354 has a major axis nominally dimensioned 0.286 inch long and a minor axis nominally dimensioned 0.273 inch long. Four fastener apertures 1331, 1332, 1337, 1338 are placed in locations corresponding to the corner mounting holes of a valve 1290, fluid delivery substrate 1200, or similar component (similar to the illustration in FIG. 12A FIG. 12C discussed previously). The four fastener apertures 1331, 1332, 1337, 1338 may also be cushion-shaped with a larger dimension of 0.158 inch and a smaller dimension of 0.136 inch for accommodating both UNC-#8-32 and also M4×0.7 male threads. Designers will of course appreciate that any of the many previously discussed fastener aperture types (tri-oval, ellipse, etc.) may be used instead. The sheet material 1310 is typically 0.0030 (+/−0.0002)-inch thick full hard 300-series stainless steel and the square shape is approximately 1.115-inch by 1.115-inch. Of course, these dimensions are exemplary only, and not required to implement the inventive concepts.

Figure 13B:
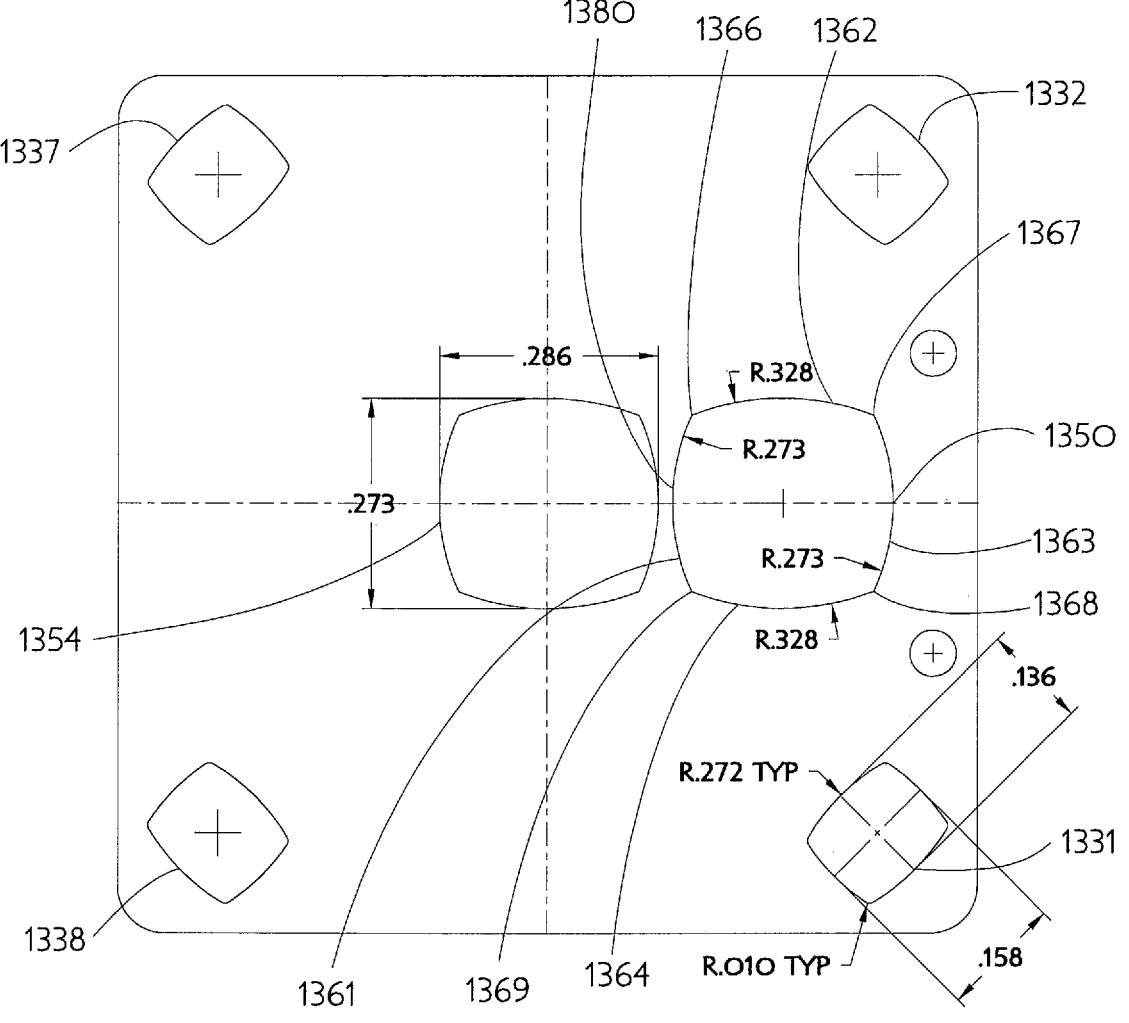
FIG. 13B shows a plan view with dimensional information related to a typical application of the dual-gasket retainer illustrated in FIG. 13A.

FIG. 13B shows a plan view with dimensional information related to the cushion-shaped gasket-capturing apertures 1350, 1354 of the dual-gasket retainer 1300 illustrated in FIG. 13A. A typical four sided (nearly square) cushion-shaped gasket-capturing aperture 1350 is comprised of two opposing concave large radius sides 1362, 1364 swung from a minor axis, and two opposing similar large (but not necessarily identical) radius concave sides 1361, 1363 swung from a perpendicular major axis. The four corners 1366, 1367, 1368, 1369 where these generally large radii meet may be made as suitably blended small radii. It is of course important that adjacent gasket-capturing apertures 1350, 1354 have a co-linear axis (either major or minor) to ensure the intervening material web 1380 between them remains intact. The aperture opening dimensions between diagonal corners (e.g. the pair 1367 and 1369, or alternatively the pair 1366 and 1368) are so large that adjacent apertures will intersect if the axes are rotated and this is why the co-linear relationship is desired.

While this invention has been described with respect to various specific examples and embodiments, it is to be understood that various modifications may be made without departing from the scope thereof. Therefore, the above description should not be construed as limiting the invention, but merely as an exemplification of preferred embodiments thereof and that the invention can be variously practiced within the scope of the following claims.

What is claimed is:

1. A gasket retainer for use in a fluid delivery system, comprising:

a base member formed of a substantially flat sheet of material; and a gasket-capturing aperture having a non-convex periphery disposed in said base member;

wherein the gasket-capturing aperture includes three periphery portions of the same shape with a major diameter sufficiently large to allow passage of a circular element therethrough and a minor diameter sufficiently small to engage a cavity, groove, or thread on the outside diameter of said circular element, wherein the three periphery portions are curved, and wherein a corner is defined between each one of the three curved periphery portions of the gasket-capturing aperture, and wherein each of the three periphery portions are continuously curved between each of the defined corners; and the base member is flexed and then released during the installation of the circular element, and wherein the gasket aperture is configured to retain a gasket in a fluid delivery system by flexing and releasing to engage a gasket periphery.

2. The gasket retainer of claim 1, wherein the base member comprises stainless steel.

3. The gasket retainer of claim 1, wherein the base member is rectangular shaped.

4. The gasket retainer of claim 1, further comprising at least one fastener aperture.

5. The gasket aperture of claim 1, further comprising a pair of fastener apertures.

6. The gasket aperture of claim 5, wherein the pair of fastener apertures are diametrically opposed across the gasket-capturing major aperture.

7. The gasket aperture of claim 1, wherein each of the three periphery portions are straight.

8. The gasket aperture of claim 7, the three periphery portions form an equilateral triangle.

9. The gasket aperture of claim 1, further comprising a gasket inserted into the gasket-capturing aperture.

10. The gasket aperture of claim 1, wherein each of the three curved periphery portions define a first radius.

11. The gasket aperture of claim 10, wherein each of the corners defines a second radius.

12. The gasket aperture of claim 11, wherein the second radius is smaller than the first radius.

13. The gasket aperture of claim 1, wherein a circular gasket is disposed within the gasket-capturing aperture.

\* \* \* \* \*